United States Patent
Bonwick et al.

(10) Patent No.: US 8,392,428 B1
(45) Date of Patent: Mar. 5, 2013

(54) METHOD AND SYSTEM FOR HASH FRAGMENT REPRESENTATION

(75) Inventors: Jeffrey S. Bonwick, Los Altos, CA (US); Nils Nieuwejaar, Belmont, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 13/611,797

(22) Filed: Sep. 12, 2012

(51) Int. Cl.
 *G06F 7/00* (2006.01)
 *G06F 17/30* (2006.01)
 *G06F 12/00* (2006.01)
(52) U.S. Cl. .......... 707/747; 707/797; 711/216
(58) Field of Classification Search .......... 707/797, 707/747; 711/216
 See application file for complete search history.

(56) References Cited

U.S. PATENT DOCUMENTS

| | | | |
|---|---|---|---|
| 5,950,199 A * | 9/1999 | Schmuck et al. ............... 1/1 |
| 5,990,810 A * | 11/1999 | Williams .................... 341/51 |
| 6,850,969 B2 | 2/2005 | Ladan-Mozes et al. |
| 6,996,682 B1 | 2/2006 | Milligan et al. |
| 7,032,096 B2 * | 4/2006 | Haas et al. .................... 711/216 |
| 7,146,371 B2 * | 12/2006 | Hofstee et al. ................ 1/1 |
| 7,366,825 B2 | 4/2008 | Williams et al. |
| 7,543,100 B2 | 6/2009 | Singhal et al. |
| 7,610,438 B2 | 10/2009 | Lee et al. |
| 7,634,627 B1 | 12/2009 | Ohr et al. |
| 7,650,458 B2 | 1/2010 | Rogers et al. |
| 7,685,126 B2 | 3/2010 | Patel et al. |
| 7,694,091 B2 | 4/2010 | Andrewartha et al. |
| 7,702,849 B2 | 4/2010 | Saarinen et al. |
| 7,739,312 B2 | 6/2010 | Gordon et al. |
| 7,773,420 B2 | 8/2010 | Kim |
| 7,836,018 B2 | 11/2010 | Oliveira et al. |
| 7,870,327 B1 | 1/2011 | Cornwell et al. |
| 7,904,640 B2 | 3/2011 | Yano et al. |
| 7,913,032 B1 | 3/2011 | Cornwell et al. |
| 8,261,020 B2 * | 9/2012 | Krishnaprasad et al. ...... 711/118 |
| 2006/0271540 A1 * | 11/2006 | Williams ..................... 707/7 |
| 2007/0073989 A1 | 3/2007 | Sharma et al. |
| 2007/0118578 A1 * | 5/2007 | Ahrens et al. ................ 707/205 |
| 2007/0168633 A1 | 7/2007 | English et al. |
| 2009/0019245 A1 | 1/2009 | Bondurant et al. |
| 2009/0164783 A1 * | 6/2009 | Solis et al. ................... 713/168 |
| 2009/0198902 A1 | 8/2009 | Khmelnitsky et al. |
| 2009/0198947 A1 | 8/2009 | Khmelnitsky et al. |
| 2009/0198952 A1 | 8/2009 | Khmelnitsky et al. |

(Continued)

OTHER PUBLICATIONS

Kazmi, A., "PCI Express™ Basics & Applications in Communication Systems," PCI-SIG Developers Conference, 2004 (50 pages).

(Continued)

*Primary Examiner* — Jeffrey A Burke
(74) *Attorney, Agent, or Firm* — Osha Liang LLP

(57) ABSTRACT

A method for writing data to persistent storage. The method include receiving a first write request including a key and a value, hashing the key to obtain a hashed key, obtaining a hash table depth (d), obtaining d bits from the hashed key, and making a first determination that a hash frag associated with the d bits from the hashed key exists. In response to the first determination, obtaining the hash frag, making a second determination that there is available space to store a hash frag entry in the hash frag, storing the hash frag entry in the hash frag to obtain an updated hash frag, where the hash frag entry includes the hashed key and value information for the value, and storing the updated hash frag in the persistent storage.

15 Claims, 27 Drawing Sheets

U.S. PATENT DOCUMENTS

| | | |
|---|---|---|
| 2010/0030827 A1 | 2/2010 | Sarakas |
| 2010/0042790 A1 | 2/2010 | Mondal et al. |
| 2010/0058027 A1* | 3/2010 | Gong et al. .................. 711/216 |
| 2010/0070735 A1 | 3/2010 | Chen et al. |
| 2010/0106895 A1 | 4/2010 | Condit et al. |
| 2010/0228800 A1 | 9/2010 | Aston et al. |
| 2010/0281230 A1 | 11/2010 | Rabii et al. |
| 2010/0332846 A1* | 12/2010 | Bowden et al. .............. 713/189 |
| 2011/0022780 A1 | 1/2011 | Wakrat et al. |
| 2011/0238886 A1 | 9/2011 | Post et al. |
| 2011/0238899 A1* | 9/2011 | Yano et al. .................... 711/103 |
| 2011/0238909 A1* | 9/2011 | Kumar et al. ................. 711/114 |

OTHER PUBLICATIONS

Percival, D., "Multicast Over PCT Express®," PCI-SIG Developer's Conference Europe, 2009 (33 pages).

Huffman, A., NVM Express Revision 1.0b, Jul. 12, 2011 (126 pages).

Regula, J., Using Non-transparent Bridging in PCI Express Systems, Jun. 1, 2004 (31 pages).

* cited by examiner

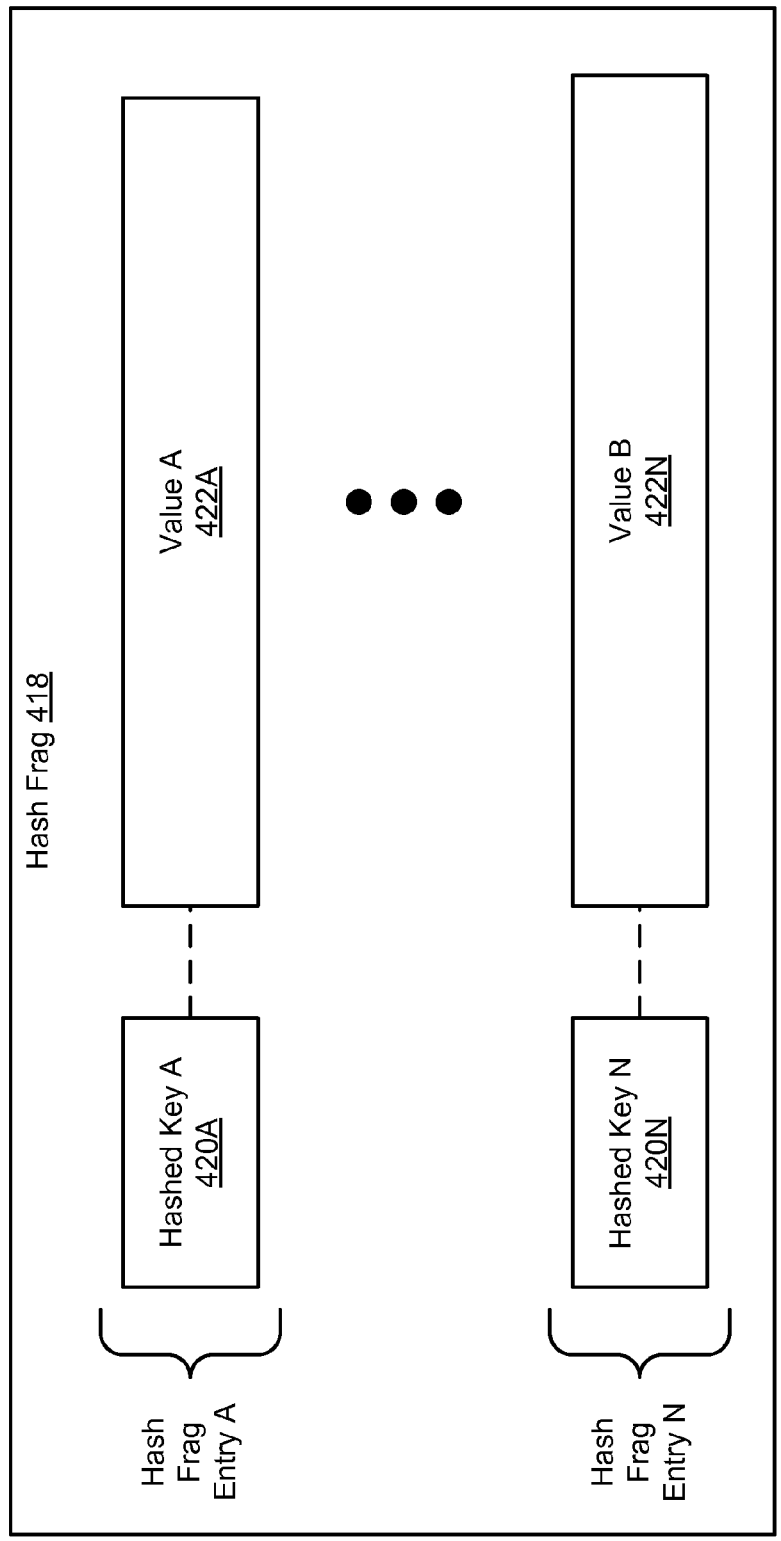

METHOD AND SYSTEM FOR HASH FRAGMENT REPRESENTATION

BACKGROUND

Storage systems typically store data and the metadata that is used to locate the data in the storage system. The manner in which the metadata is organized and stored in the storage system may have a large impact on the ability to successfully scale a storage system while maintaining performance.

SUMMARY

In general, in one aspect, the invention relates to a method for writing data to persistent storage. The method includes receiving a write request comprising a key and a value, hashing the key to obtain a hashed key, obtaining a hash table depth (d), obtaining d bits from the hashed key, wherein the d bits from the hashed key are d least significant bits in the hashed key, and making a first determination that a hash frag associated with the d bits from the hashed key exists. In response to the first determination: obtaining the hash frag, making a second determination that there is available space to store a hash frag entry in the hash frag, storing the hash frag entry in the hash frag to obtain an updated hash frag, wherein the hash frag entry comprises the hashed key and value information for the value, and storing the updated hash frag in the persistent storage.

In general, in one aspect, the invention relates to a method for obtaining values from persistent storage. The method includes receiving, from a client, a read request comprising a key, hashing the key to obtain a hashed key, obtaining d bits from the hashed key, wherein the d bits from the hashed key are d least significant bits in the hashed key, and making a first determination that a first hash frag associated with the d bits from the second hashed key does not exist. In response to the first determination, making a second determination that a second hash frag associated with d−1 bits from the hashed key exists and in response to the second determination: obtaining the second hash frag, wherein the second hash frag comprises a plurality of hash frag entries, searching the second hash frag to obtain a hash frag entry of the plurality of hash frag entries comprising the hashed key, obtaining a value associated with the key using the hash frag entry, and providing the value to the client.

Other aspects of the invention will be apparent from the following description and the appended claims.

BRIEF DESCRIPTION OF DRAWINGS

FIGS. 4B-4D show hash frags in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-10B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for storing keys and corresponding values in a hash table. More specifically, embodiments of the invention relate to using an object implementing a hash table, which includes individually allocatable and addressable sub-regions, to store keys along with the corresponding values or value information. Further, embodiments of the invention provide a method and system for scaling the hash object based on the keys that are inserted.

Figure 1A:
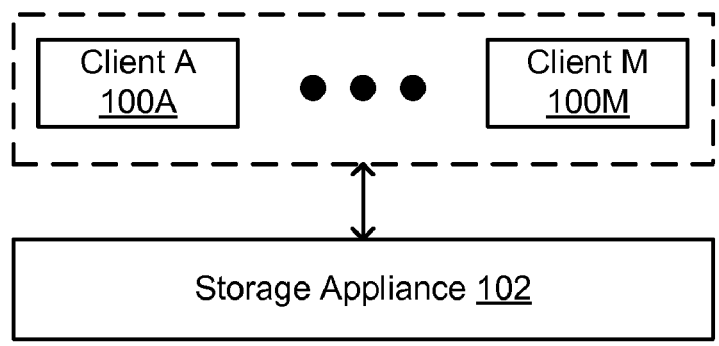
FIGS. 1A-1E show systems in accordance with one or more embodiments of the invention.

FIGS. 1A-1E show systems in accordance with one or more embodiments of the invention. Referring to FIG. 1A, the system includes one or more clients (client A (100A), client M (100M)) operatively connected to a storage appliance (102).

In one embodiment of the invention, clients (100A, 100M) correspond to any system that includes functionality to issue a read request to the storage appliance (102) and/or issue a write request to the storage appliance (102). Though not shown in FIG. 1A, each of the clients (100A, 100M) may include a client processor and client memory. Additional details about components in a client are described in FIG. 1D below. In one embodiment of the invention, the clients (100A, 100M) are configured to communicate with the storage appliance (102) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe)

over a PCI-Express fabric, Non-Volatile Memory Express (NVMe) over an Ethernet fabric, and Non-Volatile Memory Express (NVMe) over an Infiniband fabric. Those skilled in the art will appreciate that the invention is not limited to the aforementioned protocols.

In one or more embodiments of the invention, if the client implements PCI, PCI-express, or NVMe, then the client includes a root complex (not shown). In one embodiment of the invention, the root complex is a device that connects the client processor and client memory to the PCIe Fabric. In one embodiment of the invention, the root complex is integrated into the client processor.

Figure 1B:
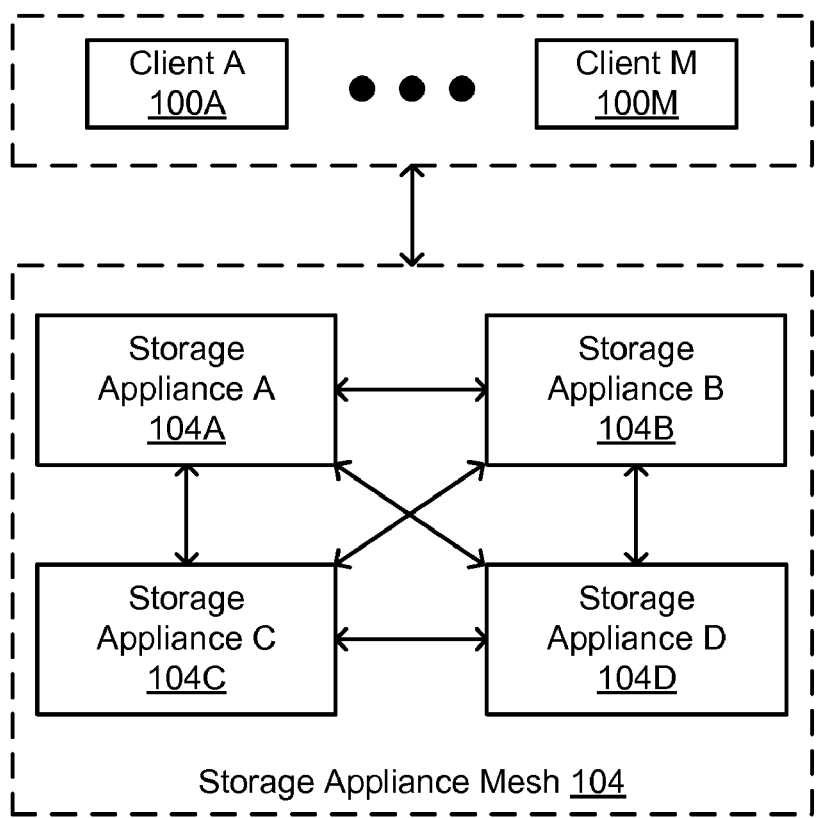
Figure 1C:
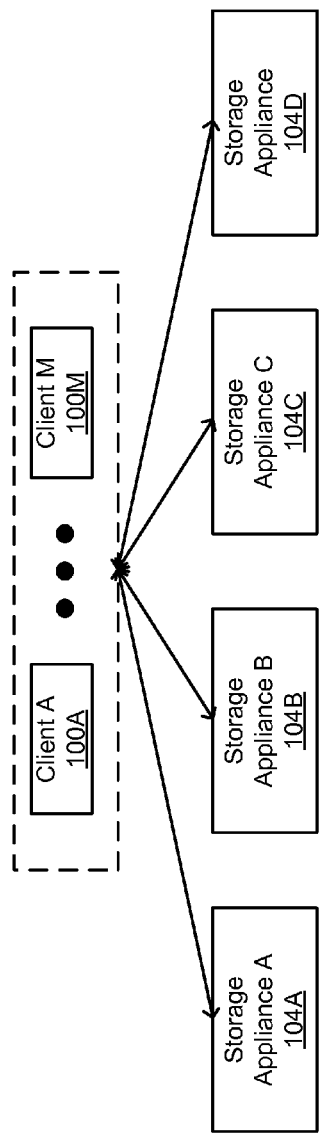
Figure 1D:
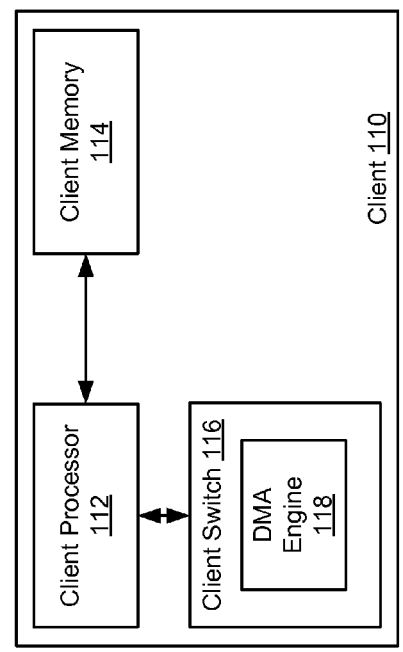
Figure 2A:
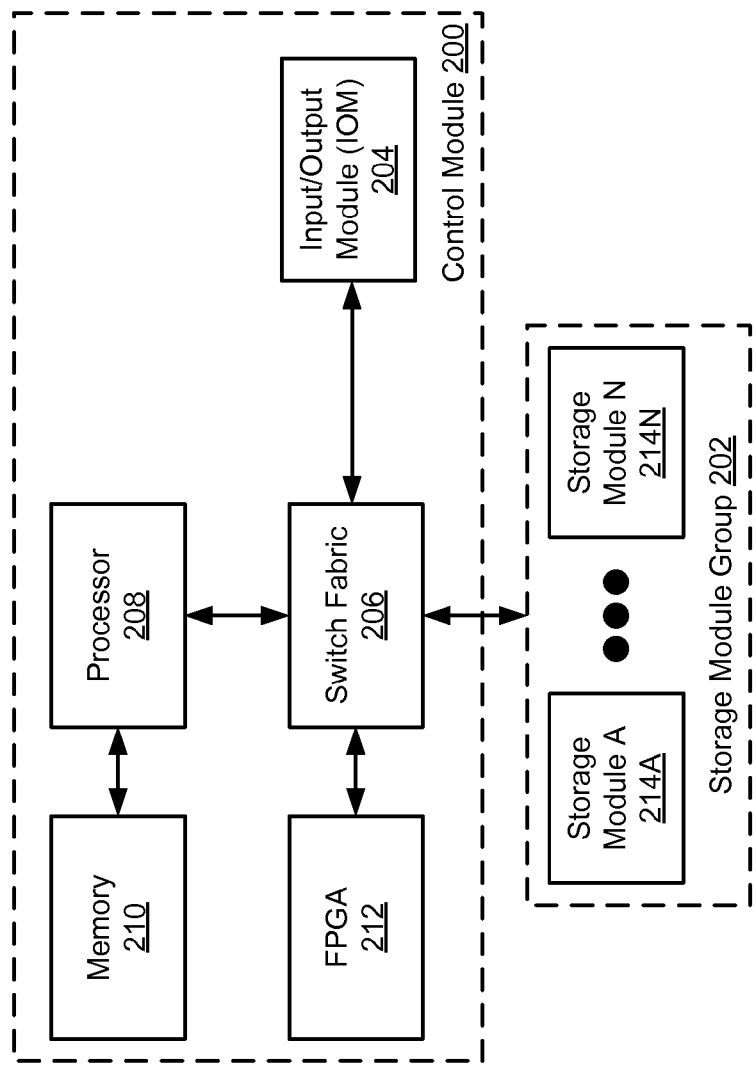
FIGS. 2A-2D show storage appliances in accordance with one or more embodiments of the invention.

In one embodiment of the invention, the PCIe Fabric includes root complexes and endpoints which are connected via switches (e.g., client switch (116) in FIG. 1D and switches within the switch fabric, e.g., switch fabric (206) in FIG. 2A). In one embodiment of the invention, an endpoint is a device other than a root complex or a switch that can originate PCI transactions (e.g., read request, write request) or that is a target of PCI transactions.

In one embodiment of the invention, a single client and a single storage appliance may be considered part of a single PCIe Fabric. In another embodiment of the invention, any combination of one or more clients and one or more storage appliances may be considered part of a single PCIe Fabric. Further, if the individual components within the storage appliance communicate using PCIe, and individual components in the client (see FIG. 1D) communicate using PCIe, then all the components in the storage appliance and the client may be considered part of a single PCIe Fabric. Those skilled in the art will appreciate that various embodiments of the invention may be implemented using another type of fabric without departing from the invention.

Continuing with FIG. 1A, in one embodiment of the invention, the storage appliance (102) is a system that includes volatile and persistent storage and is configured to service read requests and/or write requests from one or more clients (100A, 100M). Various embodiments of the storage appliance (102) are described below in FIGS. 2A-2D.

Referring to FIG. 1B, FIG. 1B shows a system in which clients (100A, 100M) are connected to multiple storage appliances (104A, 104B, 104C, 104D) arranged in a mesh configuration (denoted as storage appliance mesh (104) in FIG. 1B). As shown in FIG. 1B, the storage appliance mesh (104) is shown in a fully-connected mesh configuration—that is, every storage appliance (104A, 104B, 104C, 104D) in the storage appliance mesh (104) is directly connected to every other storage appliance (104A, 104B, 104C, 104D) in the storage appliance mesh (104). In one embodiment of the invention, each of the clients (100A, 100M) may be directly connected to one or more storage appliances (104A, 104B, 104C, 104D) in the storage appliance mesh (104). Those skilled in the art will appreciate that the storage appliance mesh may be implemented using other mesh configurations (e.g., partially connected mesh) without departing from the invention.

Referring to FIG. 1C, FIG. 1C shows a system in which clients (100A, 100M) are connected to multiple storage appliances (104A, 104B, 104C, 104D) arranged in a fan-out configuration. In this configuration, each client (100A, 100M) is connected to one or more of the storage appliances (104A, 104B, 104C, 104D); however, there is no communication between the individual storage appliances (104A, 104B, 104C, 104D).

Referring to FIG. 1D, FIG. 1D shows a client in accordance with one or more embodiments of the invention. As shown in FIG. 1D, the client (110) includes a client processor (112), client memory (114), and a client switch (116). Each of these components is described below.

In one embodiment of the invention, the client processor (112) is a group of electronic circuits with a single core or multiple cores that are configured to execute instructions. In one embodiment of the invention, the client processor (112) may be implemented using a Complex Instruction Set (CISC) Architecture or a Reduced Instruction Set (RISC) Architecture. In one or more embodiments of the invention, the client processor (112) includes a root complex (as defined by the PCIe protocol) (not shown). In one embodiment of the invention, if the client (110) includes a root complex (which may be integrated into the client processor (112)) then the client memory (114) is connected to the client processor (112) via the root complex. Alternatively, the client memory (114) is directly connected to the client processor (112) using another point-to-point connection mechanism. In one embodiment of the invention, the client memory (114) corresponds to any volatile memory including, but not limited to, Dynamic Random-Access Memory (DRAM), Synchronous DRAM, SDR SDRAM, and DDR SDRAM.

In one embodiment of the invention, the client memory (114) includes one or more of the following: a submission queue for the client processor and a completion queue for the client processor. In one embodiment of the invention, the storage appliance memory includes one or more submission queues for client processors visible to a client through the fabric, and the client memory includes one or more completion queues for the client processor visible to the storage appliance through the fabric. In one embodiment of the invention, the submission queue for the client processor is used to send commands (e.g., read request, write request) to the client processor. In one embodiment of the invention, the completion queue for the client processor is used to signal the client processor that a command it issued to another entity has been completed. Embodiments of the invention may be implemented using other notification mechanisms without departing from the invention.

In one embodiment of the invention, the client switch (116) includes only a single switch. In another embodiment of the invention, the client switch (116) includes multiple interconnected switches. If the client switch (116) includes multiple switches, each switch may be connected to every other switch, may be connected to a subset of the switches in the switch fabric, or may only be connected to one other switch. In one embodiment of the invention, each of the switches in the client switch (116) is a combination of hardware and logic (implemented, for example, using integrated circuits) (as defined by the protocol(s) the switch fabric implements) that is configured to permit data and messages to be transferred between the client (110) and the storage appliances (not shown).

In one embodiment of the invention, when the clients (100A, 100M) implement one or more of the following protocols PCI, PCIe, or PCI-X, the client switch (116) is a PCI switch.

In such embodiments, the client switch (116) includes a number of ports, where each port may be configured as a transparent bridge or a non-transparent bridge. Ports implemented as transparent bridges allow the root complex to continue discovery of devices (which may be other root complexes, switches, PCI bridges, or endpoints) connected (directly or indirectly) to the port. In contrast, when a root complex encounters a port implemented as a non-transparent bridge, the root complex is not able to continue discovery of devices connected to the port—rather, the root complex treats such a port as an endpoint.

When a port is implemented as a non-transparent bridge, devices on either side of the non-transparent bridge may only communicate using a mailbox system and doorbell interrupts (implemented by the client switch). The doorbell interrupts allow a processor on one side of the non-transparent bridge to issue an interrupt to a processor on the other side of the non-transparent bridge. Further, the mailbox system includes one or more registers that are readable and writeable by processors on either side of the switch fabric. The aforementioned registers enable processors on either side of the client switch to pass control and status information across the non-transparent bridge.

In one embodiment of the invention, in order to send a PCI transaction from a device on one side of the non-transparent bridge to a device on the other side of the non-transparent bridge, the PCI transaction must be addressed to the port implementing the non-transparent bridge. Upon receipt of the PCI transaction, the client switch performs an address translation (either using a direct address translation mechanism or a look-up table based translation mechanism). The resulting address is then used to route the packet towards the appropriate device on the other side of the non-transparent bridge.

In one embodiment of the invention, the client switch (116) is configured such that at least a portion of the client memory (114) is directly accessible to the storage appliance. Said another way, a storage appliance on one side of the client switch may directly access, via the client switch, client memory on the other side of the client switch.

In one embodiment of the invention, the client switch (116) includes a DMA engine (118). In one embodiment of the invention, the DMA engine (118) may be programmed by either the client processor or a storage appliance connected to the client switch. As discussed above, the client switch (116) is configured such that at least a portion of the client memory (114) is accessible to the storage appliance or storage modules. Accordingly, the DMA engine (118) may be programmed to read data from an address in the portion of the client memory that is accessible to the storage appliance and directly write a copy of such data to memory in the storage appliance or storage modules. Further, the DMA engine (118) may be programmed to read data from the storage appliance and directly write a copy of such data to an address in the portion of the client memory that is accessible to the storage appliance.

In one embodiment of the invention, the DMA engine (118) supports multicasting. In such embodiments, a processor in the storage appliance (see FIG. 2A) may create a multicast group, where each member of the multicast group corresponds to a unique destination address in memory on the storage appliance. Each member of the multicast group is associated with a descriptor that specifies: (i) the destination address; (ii) the source address; (iii) the transfer size field; and (iv) a control field. The source address for each of the descriptors remains constant while the destination address changes for each descriptor. Once the multicast group is created, any data transfer through the switch targeting the multicast group address, including a transfer initiated by a DMA engine, places an identical copy of the data in all of the destination ports associated with the multicast group. In one embodiment of the invention, the switch processes all of the multicast group descriptors in parallel.

Continuing with the discussion of FIG. 1D, those skilled in the art will appreciate that while FIG. 1D shows a client switch (116) located in the client (110), the client switch (116) may be located external to the client without departing from the invention. Further, those skilled in the art will appreciate that the DMA engine (118) may be located external to the client switch (116) without departing from the invention.

Figure 1E:
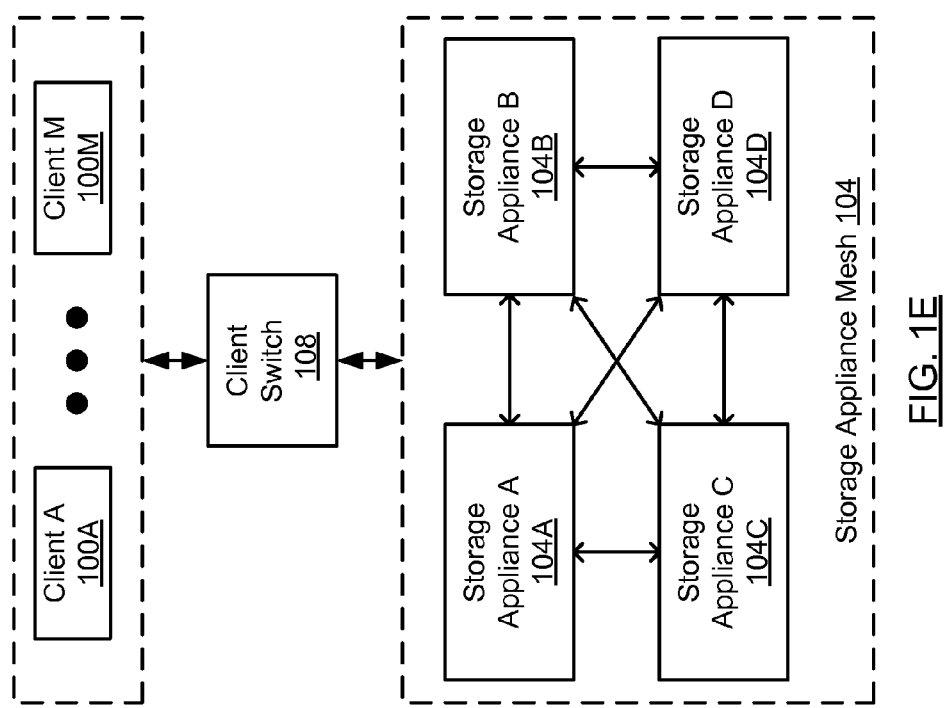

Referring FIG. 1E, FIG. 1E shows a system in which clients (100A, 100M) are connected, via a client switch (108), to multiple storage appliances (104A, 104B, 104C, 104D) arranged in a mesh configuration (denoted as storage appliance mesh (104) in FIG. 1E). In the embodiment shown in FIG. 1E, each client (100A, 100M) does not include its own client switch—rather, all of the clients share a client switch (108). As shown in FIG. 1E, the storage appliance mesh (104) is shown in a fully-connected mesh configuration—that is, every storage appliance (104A, 104B, 104C, 104D) in the storage appliance mesh (104) is directly connected to every other storage appliance (104A, 104B, 104C, 104D) in the storage appliance mesh (104). In one embodiment of the invention, the client switch (108) may be directly connected to one or more storage appliances (104A, 104B, 104C, 104D) in the storage appliance mesh (104). Those skilled in the art will appreciate that storage appliance mesh may be implemented using other mesh configurations (e.g., partially connected mesh) without departing from the invention.

Though not shown in FIG. 1E, each client may include its own client switch (as shown in FIG. 1D) but may be connected to the storage appliance mesh (104) using a switch fabric (defined below).

Those skilled in the art will appreciate that while FIGS. 1A-1E show storage appliances connected to a limited number of clients, the storage appliances may be connected to any number of clients without departing from the invention. Those skilled in the art will appreciate that while FIGS. 1A-1E show various system configurations, the invention is not limited to the aforementioned system configurations. Further, those skilled in the art will appreciate that the clients (regardless of the configuration of the system) may be connected to the storage appliance(s) using a switch fabric (not shown) (described below) without departing from the invention.

FIGS. 2A-2D show embodiments of storage appliances in accordance with one or more embodiments of the invention. Referring to FIG. 2A, the storage appliance includes a control module (200) and a storage module group (202). Each of these components is described below. In general, the control module (200) is configured to manage the servicing of read and write requests from one or more clients. In particular, the control module is configured to receive requests from one or more clients via the IOM (discussed below), to process the request (which may include sending the request to the storage module), and to provide a response to the client after the request has been serviced. Additional details about the components in the control module are included below. Further, the operation of the control module with respect to servicing read and write requests is described below with reference to FIGS. 6A-10B.

Continuing with the discussion of FIG. 2A, in one embodiment of the invention, the control module (200) includes an Input/Output Module (IOM) (204), a switch fabric (206), a processor (208), a memory (210), and, optionally, a Field Programmable Gate Array (FPGA) (212). In one embodiment of the invention, the IOM (204) is the physical interface between the clients (100A, 100M in FIGS. 1A-1E) and the other components in the storage appliance. The IOM supports one or more of the following protocols: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE). Those skilled in the art will appreciate that the IOM may be implemented using protocols other than those listed above without departing from the invention.

Continuing with the discussion of FIG. 2A, the switch fabric (206) includes only a single switch. In another embodiment of the invention, the switch fabric (206) includes multiple interconnected switches. If the switch fabric (206) includes multiple switches, each switch may be connected to every other switch, may be connected to a subset of switches in the switch fabric, or may only be connected to one other switch in the switch fabric. In one embodiment of the invention, each of the switches in the switch fabric (206) is a combination of hardware and logic (implemented, for example, using integrated circuits) (as defined by the protocol(s) the switch fabric implements) that is configured to connect various components together in the storage appliance and to route packets (using the logic) between the various connected components. In one embodiment of the invention, the switch fabric (206) is physically connected to the IOM (204), processor (208), storage module group (202), and, if present, the FPGA (212). In one embodiment of the invention, all inter-component communication in the control module (200) (except between the processor (208) and memory (210)) passes through the switch fabric (206). Further, all communication between the control module (200) and the storage module group (202) passes through the switch fabric (206). In one embodiment of the invention, the switch fabric (206) is implemented using a PCI protocol (e.g., PCI, PCIe, PCI-X, or another PCI protocol). In such embodiments, all communication that passes through the switch fabric (206) uses the corresponding PCI protocol.

In one embodiment of the invention, if the switch fabric implements a PCI protocol, the switch fabric (206) includes a port for the processor (or, more specifically, a port for the root complex integrated in the processor (208) or for the root complex connected to the processor), one or more ports for storage modules (214A, 214N) (see FIG. 3) in the storage module group (202), a port for the FPGA (212) (if present), and a port for the IOM (204). In one or more embodiments of the invention, each of the aforementioned ports may be configured as a transparent bridge or a non-transparent bridge (as discussed above). Those skilled in the art will appreciate that while the switch fabric (206) has been described with respect to a PCI implementation, the switch fabric (206) may be implemented using other protocols without departing from the invention.

In one embodiment of the invention, at least one switch in the switch fabric (206) is configured to implement multicasting. More specifically, in one embodiment of the invention, the processor (208) is configured to generate a multicast group where the multicast group includes two or more members with each member specifying an address in the memory (210) and/or in the storage modules (214A, 214N). When the multicast group is created, the multicast group is associated with a multicast address. In order to implement the multicasting, at least one switch in the switch fabric is configured that when a write specifying the multicast address as the destination address is received, the switch is configured to generate a new write for each member in the multicast group and issue the writes to the appropriate address in the storage appliance. In one embodiment of the invention, the address for each write generated by the switch is determined by adding a particular offset to the multicast address.

Continuing with FIG. 2A, the processor (208) is a group of electronic circuits with a single core or multi-cores that are configured to execute instructions. In one embodiment of the invention, the processor (208) may be implemented using a Complex Instruction Set (CISC) Architecture or a Reduced Instruction Set (RISC) Architecture. In one or more embodiments of the invention, the processor (208) includes a root complex (as defined by the PCIe protocol). In one embodiment of the invention, if the control module (200) includes a root complex (which may be integrated into the processor (208)) then the memory (210) is connected to the processor (208) via the root complex. Alternatively, the memory (210) is directly connected to the processor (208) using another point-to-point connection mechanism. In one embodiment of the invention, the memory (210) corresponds to any volatile memory including, but not limited to, Dynamic Random-Access Memory (DRAM), Synchronous DRAM, SDR SDRAM, and DDR SDRAM.

In one embodiment of the invention, the processor (208) is configured to create and update an in-memory data structure (see FIG. 5), where the in-memory data structure is stored in the memory (210). In one embodiment of the invention, the in-memory data structure includes mappings (direct or indirect) between logical addresses and physical storage addresses in the set of storage modules. In one embodiment of the invention, the logical address is an address at which the data appears to reside from the perspective of the client. In one embodiment of the invention, the logical address is (or includes) a hash value generated by applying a hash function (e.g. SHA-1, MD-5, etc.) to an n-tuple. In one embodiment of the invention, the n-tuple is <object ID, offset>, where the object ID defines a file and the offset defines a location relative to the starting address of the file.

In another embodiment of the invention, the n-tuple is <object ID, offset, birth time>, where the birth time corresponds to the time when the file (identified using the object ID) was created. In another embodiment of the invention, the n-tuple is <object ID, fragment ID> or <object ID, fragment ID, birth time>. The fragment ID is derived from the offset, for example, the fragment ID may be derived by applying a bit mask to the offset. Alternatively, the logical address may include a logical object ID and a logical byte address, or a logical object ID and a logical address offset. In another embodiment of the invention, the logical address includes an object ID and an offset. Those skilled in the art will appreciate that multiple logical addresses may be mapped to a single physical address and that the logical address is not limited to the above embodiments.

Figure 3:
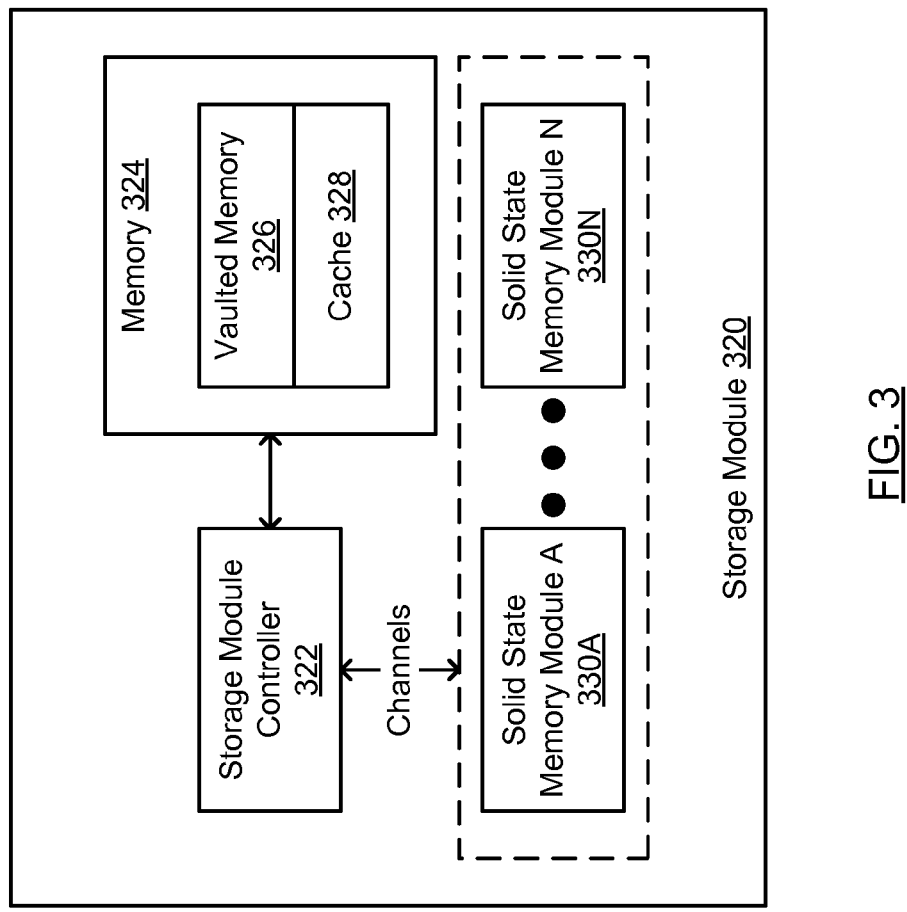
FIG. 3 shows a storage module in accordance with one or more embodiments of the invention.

In one embodiment of the invention, the physical address may correspond to (i) a location in the memory (210), (ii) a location in the vaulted memory (e.g., 324 in FIG. 3), or (iii) a location in a solid state memory module (e.g., 330A in FIG. 3). In one embodiment of the invention, the in-memory data structure may map a single hash value to multiple physical addresses if there are multiple copies of the data in the storage appliance.

In one embodiment of the invention, the memory (210) includes one or more of the following: a submission queue for the processor, a completion queue for the processor, a submission queue for each of the storage modules in the storage appliance and a completion queue for each of the storage modules in the storage appliance. In one embodiment of the invention, the submission queue for the processor is used to send commands (e.g., read request, write request) to the processor. In one embodiment of the invention, the completion queue for the processor is used to signal the processor that a command it issued to another entity has been completed. The submission and completion queues for the storage modules function in a similar manner.

In one embodiment of the invention, the processor (via the switch fabric) is configured to offload various types of processing to the FPGA (212). In one embodiment of the invention, the FPGA (212) includes functionality to calculate checksums for data that is being written to the storage module(s) and/or data that is being read from the storage module(s). In one embodiment of the invention, the storage module group (202) includes one or more storage modules (214A, 214N) each configured to store data. Storage modules are described below in FIG. 3.

In one embodiment of the invention, the processor (208) is configured to program one or more DMA engines in the system. For example, the processor (208) is configured to program the DMA engine in the client switch (see FIG. 1D). The processor (208) may also be configured to program the DMA engine in the storage module (see FIG. 3). In one embodiment of the invention, programming the DMA engine in the client switch may include creating a multicast group and generating descriptors for each of the members in the multicast group.

Figure 2B:
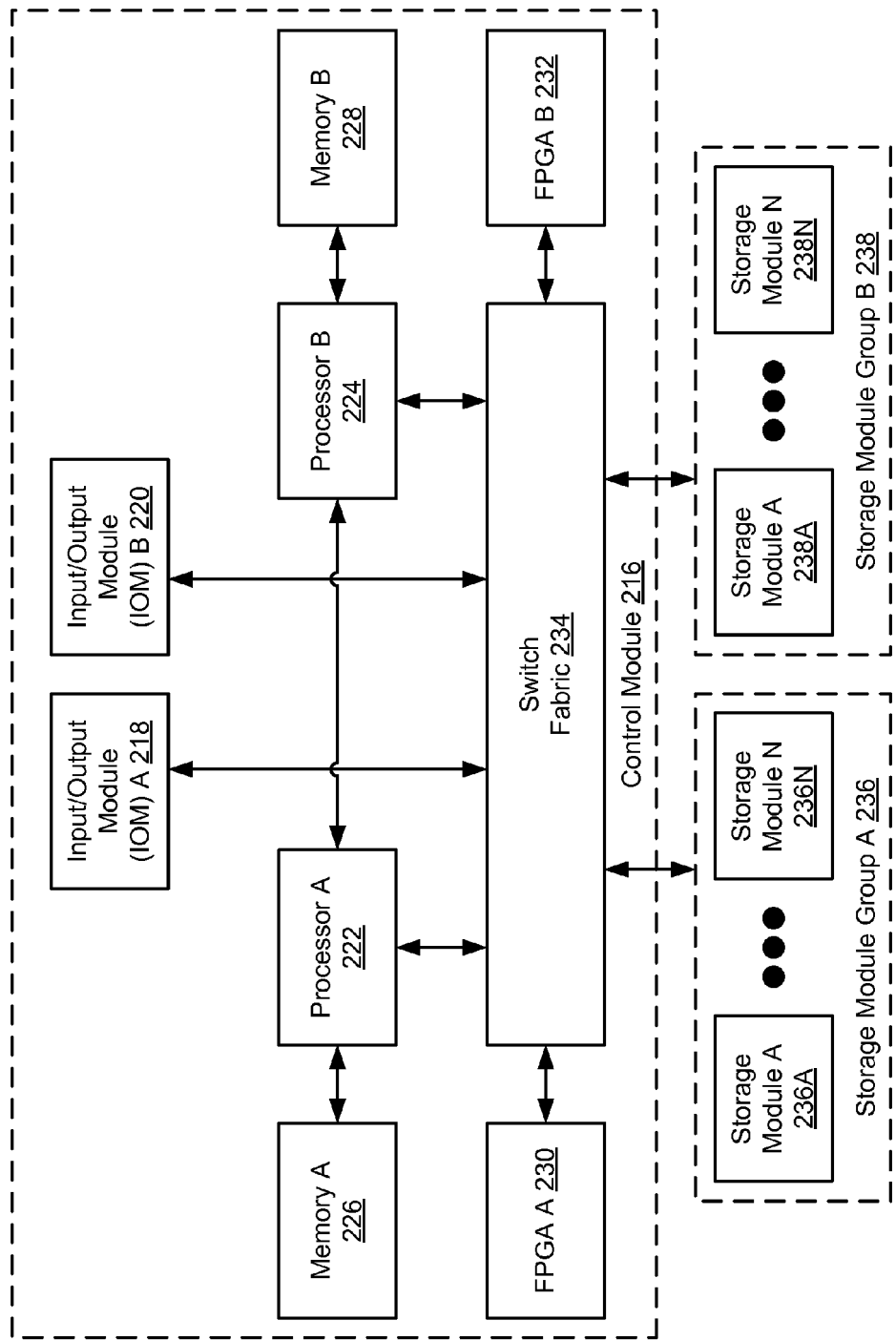

Turning to FIG. 2B, FIG. 2B shows a storage appliance in accordance with one or more embodiments of the invention. The storage appliance includes a control module (216) and at least two storage module groups (236, 238). The control module (216) includes a switch fabric (234), which is directly connected to IOM A (218), IOM B (220), processor A (222), processor B (224), (if present) FPGA A (230), (if present) FPGA B (232), storage modules (236A, 236N) in storage module group A (236) and storage modules (238A, 238N) in storage module group B (238). All communication between the aforementioned components (except between processor A (222) and processor B (224)) passes through the switch fabric (234). In one embodiment of the invention, processors (222, 224) within the control module (216) are able to directly communicate using, for example, point-to-point interconnect such as Intel® QuickPath Interconnect. Those skilled in the art will appreciate that other point-to-point communication mechanisms may be used to permit direct communication between the processor (222, 224) without departing from the invention.

Continuing with FIG. 2B, in one embodiment of the invention, the control module (216) is substantially similar to the control module (200) in FIG. 2A. In one embodiment of the invention, the switch fabric (234) is substantially similar to the switch fabric (206) in FIG. 2A. In one embodiment of the invention, each processor (222, 224) is substantially similar to the processor (208) in FIG. 2A. In one embodiment of the invention, the memory (226, 228) is substantially similar to the memory (210) in FIG. 2A. In one embodiment of the invention, the IOMs (218, 220) are substantially similar to the IOM (204) in FIG. 2A. In one embodiment of the invention, the FPGAs (230, 232) are substantially similar to the FPGA (212) in FIG. 2A. Finally, the storage module groups (236, 238) are substantially similar to the storage module group (202) in FIG. 2A.

In one embodiment of the invention, the two IOMs (218, 220) in the control module (216) double the I/O bandwidth for the control module (216) (over the I/O bandwidth of a control module with a single IOM). Moreover, the addition of a second IOM (or additional IOMs) increases the number of clients that may be connected to a given control module and, by extension, the number of clients that can be connected to a storage appliance. In one embodiment of the invention, the use of the switch fabric (234) to handle communication between the various connected components (described above) allows each of the processors (222, 224) to directly access (via the switch fabric (234)) all FPGAs (230, 232) and all storage modules (236A, 236N, 238A, 238N) connected to the switch fabric (234).

Figure 2C:
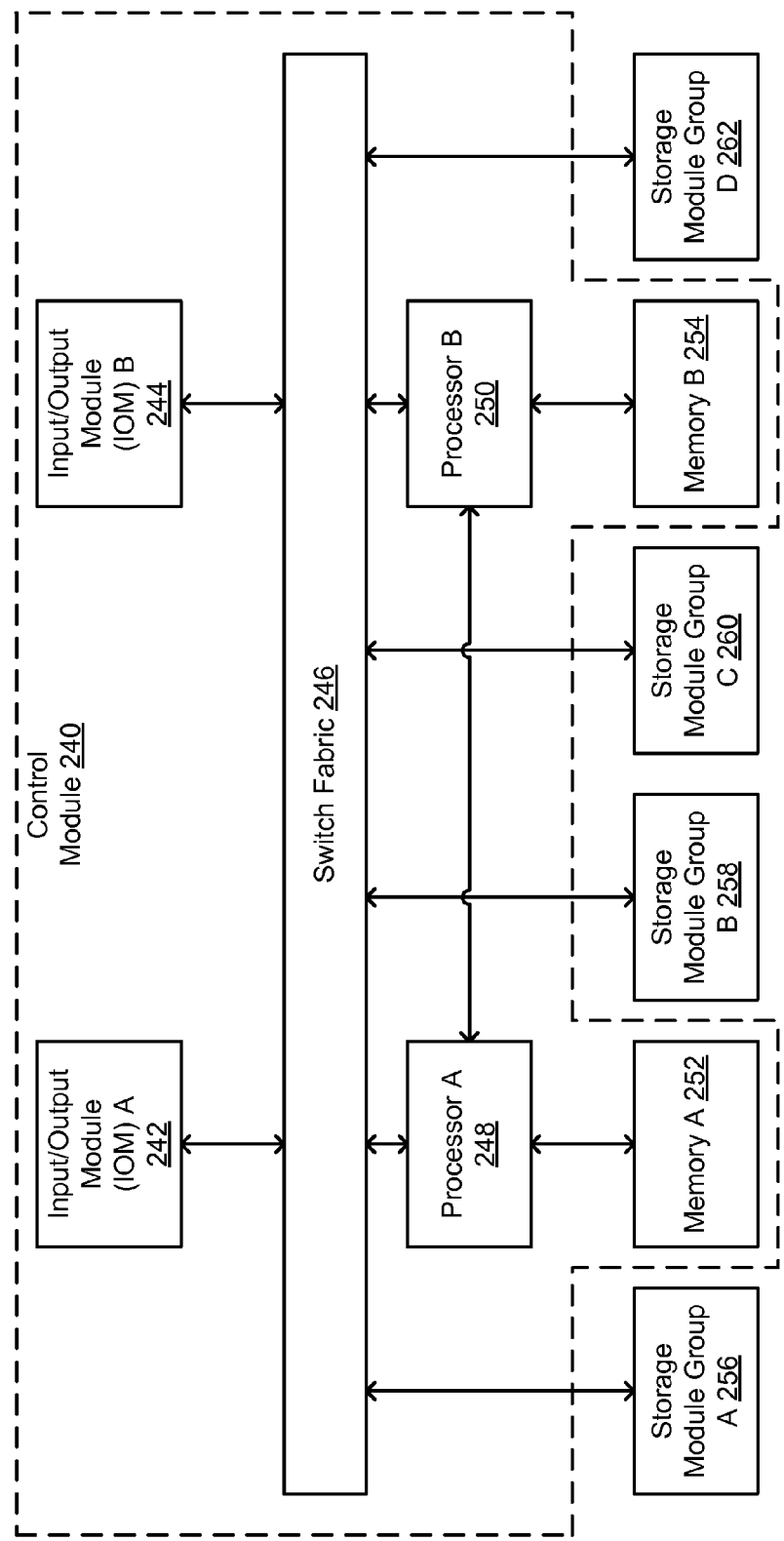

Referring to FIG. 2C, FIG. 2C shows a storage appliance that includes a control module (240) connected (via a switch fabric (246)) to multiple storage modules (not shown) in the storage module groups (256, 258, 260, 262). As shown in FIG. 2C, the control module (240) includes two IOMs (242, 244), two processors (248, 250), and memory (252, 254). In one embodiment of the invention, all components in the control module (240) communicate via the switch fabric (246). In addition, the processors (248, 250) may communicate with each other using the switch fabric (246) or a direct connection (as shown in FIG. 2C). In one embodiment of the invention, the processors (248, 250) within the control module (240) are able to directly communicate using, for example, a point-to-point interconnect such as Intel® QuickPath Interconnect. Those skilled in the art will appreciate that other point-to-point communication mechanisms may be used to permit direct communication between the processors (248, 250) without departing from the invention.

In one embodiment of the invention, processor A (248) is configured to primarily handle requests related to the storage and retrieval of data from storage module groups A and B (256, 258) while processor B (250) is configured to primarily handle requests related to the storage and retrieval of data from storage module groups C and D (260, 262). However, the processors (248, 250) are configured to communicate (via the switch fabric (246)) with all of the storage module groups (256, 258, 260, 262). This configuration enables the control module (240) to spread the processing of I/O requests between the processors and/or provides built-in redundancy to handle the scenario in which one of the processors fails.

Continuing with FIG. 2C, in one embodiment of the invention, the control module (240) is substantially similar to the control module (200) in FIG. 2A. In one embodiment of the invention, the switch fabric (246) is substantially similar to the switch fabric (206) in FIG. 2A. In one embodiment of the invention, each processor (248, 250) is substantially similar to the processor (208) in FIG. 2A. In one embodiment of the invention, the memory (252, 254) is substantially similar to the memory (210) in FIG. 2A. In one embodiment of the invention, the IOMs (242, 244) are substantially similar to the IOM (204) in FIG. 2A. Finally, the storage module groups (256, 258, 260, 262) are substantially similar to the storage module group (202) in FIG. 2A.

Figure 2D:
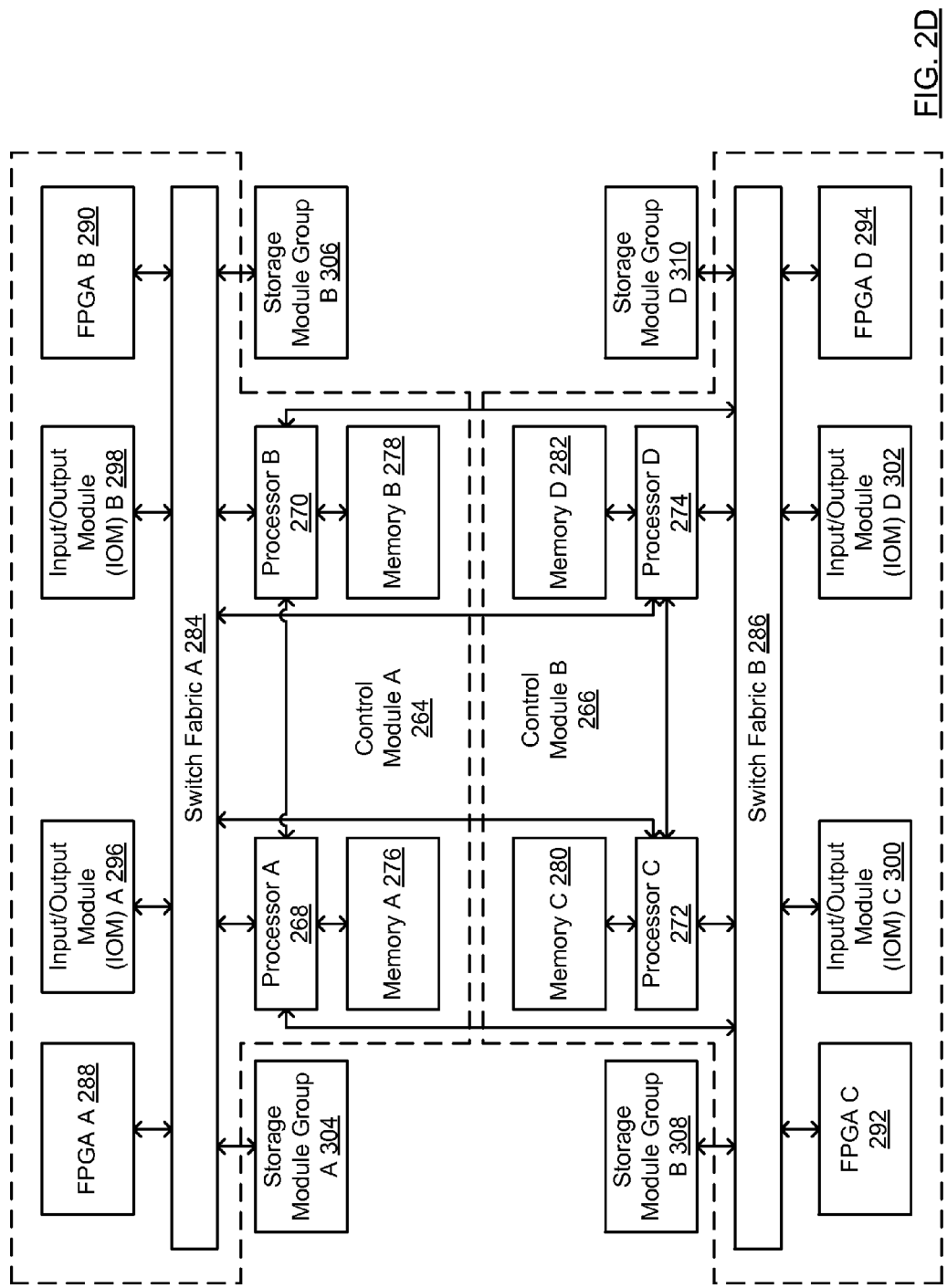

Referring to FIG. 2D, FIG. 2D shows a storage appliance that includes two control modules (264, 266). Each control module includes IOMs (296, 298, 300, 302), processors (268, 270, 272, 274), memory (276, 278, 280, 282), and FPGAs (if present) (288, 290, 292, 294). Each of the control modules (264, 266) includes a switch fabric (284, 286) through which components within the control modules communicate.

In one embodiment of the invention, processors (268, 270, 272, 274) within a control module may directly communicate with each other using, for example, a point-to-point interconnect such as Intel® QuickPath Interconnect. Those skilled in the art will appreciate that other point-to-point communication mechanisms may be used to permit direct communication between the processors (268, 270, 272, 274) without departing from the invention. In addition, processors (268, 270) in control module A may communicate with components in control module B via a direct connection to the switch fabric (286) in control module B. Similarly, processors (272, 274) in control module B may communicate with components in control module A via a direct connection to the switch fabric (284) in control module A.

In one embodiment of the invention, each of the control modules is connected to various storage modules (denoted by storage module groups (304, 306, 308, 310)). As shown in FIG. 2D, each control module may communicate with storage modules connected to the switch fabric in the control module. Further, processors in control module A (264) may communicate with storage modules connected to control module B (266) using switch fabric B (286). Similarly, processors in control module B (266) may communicate with storage modules connected to control module A (264) using switch fabric A (284).

The interconnection between the control modules allows the storage control to distribute I/O load across the storage appliance regardless of which control module receives the I/O request. Further, the interconnection of control modules enables the storage appliance to process a larger number of I/O requests. Moreover, the interconnection of control modules provides built-in redundancy in the event that a control module (or one or more components therein) fails.

With respect to FIGS. 2B-2D, in one or more embodiments of the invention, the in-memory data structure is mirrored across the memories in the control modules. In such cases, the processors in the control modules issue the necessary commands to update all memories within the storage appliance such that the in-memory data structure is mirrored across all the memories. In this manner, any processor may use its own memory to determine the location of a data (as defined by an n-tuple, discussed above) in the storage appliance. This functionality allows any processor to service any I/O request in regards to the location of the data within the storage module. Further, by mirroring the in-memory data structures, the storage appliance may continue to operate when one of the memories fails.

Those skilled in the art will appreciate that while FIGS. 2A-2D show control modules connected to a limited number of storage modules, the control module may be connected to any number of storage modules without departing from the invention. Those skilled in the art will appreciate that while FIGS. 2A-2D show various configurations of the storage appliance, the storage appliance may be implemented using other configurations without departing from the invention.

FIG. 3 shows a storage module in accordance with one or more embodiments of the invention. The storage module (320) includes a storage module controller (322), memory (324), and one or more solid state memory modules (330A, 330N). Each of these components is described below.

In one embodiment of the invention, the storage module controller (322) is configured to receive requests to read from and/or write data to one or more control modules. Further, the storage module controller (322) is configured to service the read and write requests using the memory (324) and/or the solid state memory modules (330A, 330N). Though not shown in FIG. 3, the storage module controller (322) may include a DMA engine, where the DMA engine is configured to read data from the memory (324) or from one of the solid state memory modules (330A, 330N) and write a copy of the data to a physical address in client memory (114 in FIG. 1D). Further, the DMA engine may be configured to write data from the memory (324) to one or more of the solid state memory modules. In one embodiment of the invention, the DMA engine is configured to be programmed by the processor (e.g., 208 in FIG. 2A). Those skilled in the art will appreciate that the storage module may include a DMA engine that is external to the storage module controller without departing from the invention.

In one embodiment of the invention, the memory (324) corresponds to any volatile memory including, but not limited to, Dynamic Random-Access Memory (DRAM), Synchronous DRAM, SDR SDRAM, and DDR SDRAM.

In one embodiment of the invention, the memory (324) may be logically or physically partitioned into vaulted memory (326) and cache (328). In one embodiment of the invention, the storage module controller (322) is configured to write out the entire contents of the vaulted memory (326) to one or more of the solid state memory modules (330A, 330N) in the event of notification of a power failure (or another event in which the storage module may lose power) in the storage module. In one embodiment of the invention, the storage module controller (322) is configured to write the entire contents of the vaulted memory (326) to one or more of the solid state memory modules (330A, 330N) between the time of the notification of the power failure and the actual loss of power to the storage module. In contrast, the content of the cache (328) is lost in the event of a power failure (or another event in which the storage module may lose power).

In one embodiment of the invention, the solid state memory modules correspond to any data storage device that uses solid-state memory to store persistent data. In one embodiment of the invention, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to storage class memory.

In one embodiment of the invention, the following storage locations are part of a unified address space: (i) the portion of the client memory accessible via the client switch, (ii) the memory in the control module, (iii) the memory in the storage modules, and (iv) the solid state memory modules. Accordingly, from the perspective of the processor in the storage appliance, the aforementioned storage locations (while physically separate) appear as a single pool of physical addresses. Said another way, the processor may issue read and/or write requests for data stored at any of the physical addresses in the unified address space. The aforementioned storage locations may be referred to as storage fabric that is accessible using the unified address space.

In one embodiment of the invention, a unified address space is created, in part, by the non-transparent bridge in the client switch which allows the processor in the control module to "see" a portion of the client memory. Accordingly, the processor in the control module may perform read and/or write requests in the portion of the client memory that it can "see".

As described above, the storage appliances are configured to store data. The data may be in the form of keys and values. In one embodiment of the invention, a key is an identifier that is understood by a client (or a client application executing on the client). The key may be any alpha, numeric, or alphanumeric value. Further, the key may include special characters such as, but not limited to, !, @, #, $, %, &, *, and (,). A value corresponds to any data stored by the client (or a client application executing on the client). The client (or a client application executing on the client) uses the key to identify a value. For example, the key may be a file name (Foo.doc) and the value may be the corresponding data for the file. In another example, the key may be a name of a person (e.g., John Smith) and the value may be an address (e.g., 1234 Main Street, Washington, D.C.). In another example, the key is a randomly generated alpha-numeric string (e.g., 7e4MJAcc119cSRn32) and the value is an entry in a database. In one embodiment of the invention, the key may be of any length and the value may be of any size.

Figure 4A:
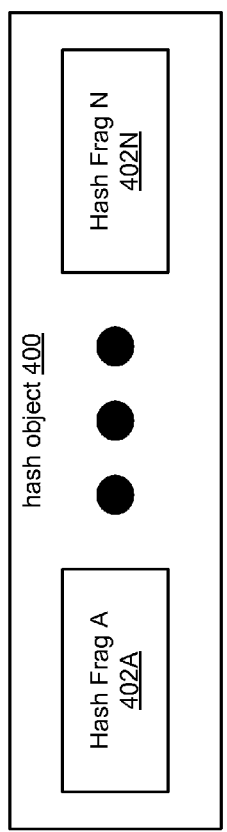
FIG. 4A shows a hash object in accordance with one or more embodiments of the invention.
Figure 4B:
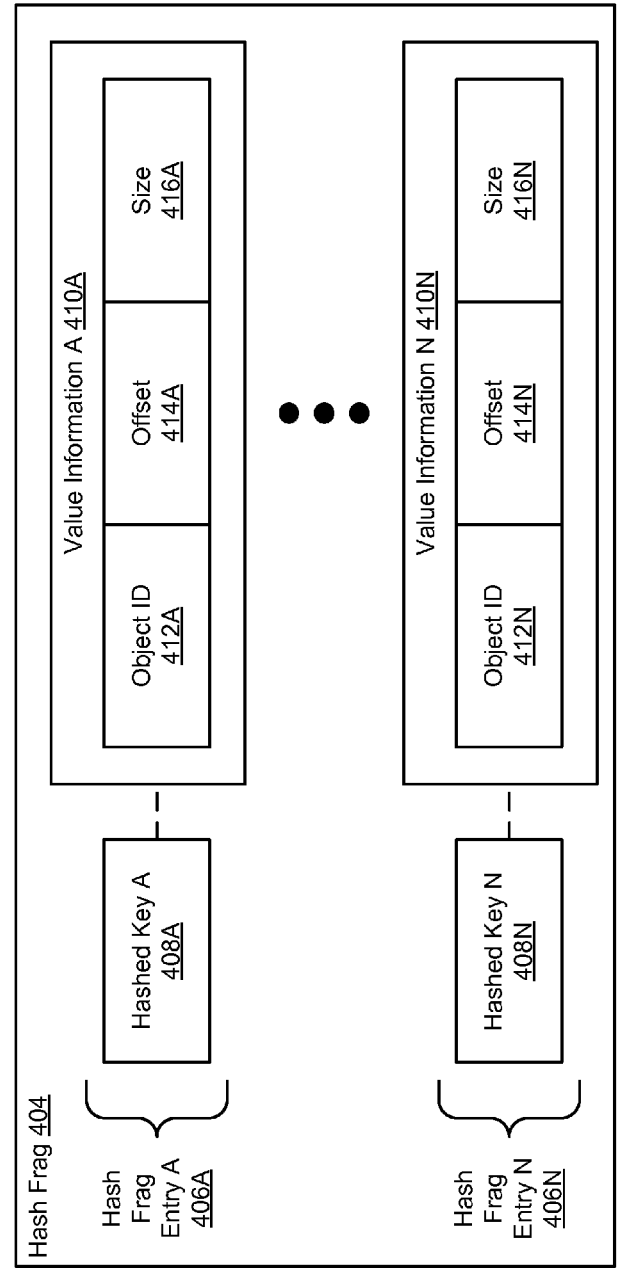

FIG. 4A shows a hash object in accordance with one embodiment of the invention. The hash object (400) includes one or more hash frags (402A, 402N). In one embodiment of the invention, various hash frags within the hash object may be stored in memory (210) and/or in a storage module (214A, 214N). The location of the various hash frags is described below in FIGS. 6C and 6D. FIG. 4B shows hash frag (404) in accordance with one or more embodiments of the invention. The hash frag (404) includes one or more hash frag entries (406A, 406N). Further, each hash frag entry (406A, 406N) may include a hashed key (408A, 408N) and value information (410A, 410N).

In one embodiment of the invention, the value information (410A, 410N) includes information about the value that is associated with the key. For example, the value information may include, but is not limited to, an object ID (412A, 412N), offset (414A, 414N), and a size (416A, 416N) field configured to store the size of the value. The value information (410A, 410N) may be used to retrieve the value from a storage module. Those skilled in the art will appreciate that any logical address (and not just the object ID and offset) may be stored in the hash frag entry without departing form the invention.

While FIG. 4B shows a hash frag that include sufficient information (e.g., value information) to retrieve the value from a storage module, in other embodiments of the invention the entire value may be stored in hash frag. An example of hash frag implementing such an embodiment is shown in FIG. 4C. Referring to FIG. 4C, the hash frag may include the hashed key (420A, 420N) and the value (422A, 422N) associated with the key. The maximum size of the value that may be stored in the hash frag may be determined by the client (or a client application executing on the client) and/or the storage appliance. Though not shown in FIGS. 4B and 4C, a hash frag may include any combination of hash frag entries shown in FIGS. 4B and 4C.

Figure 4D:
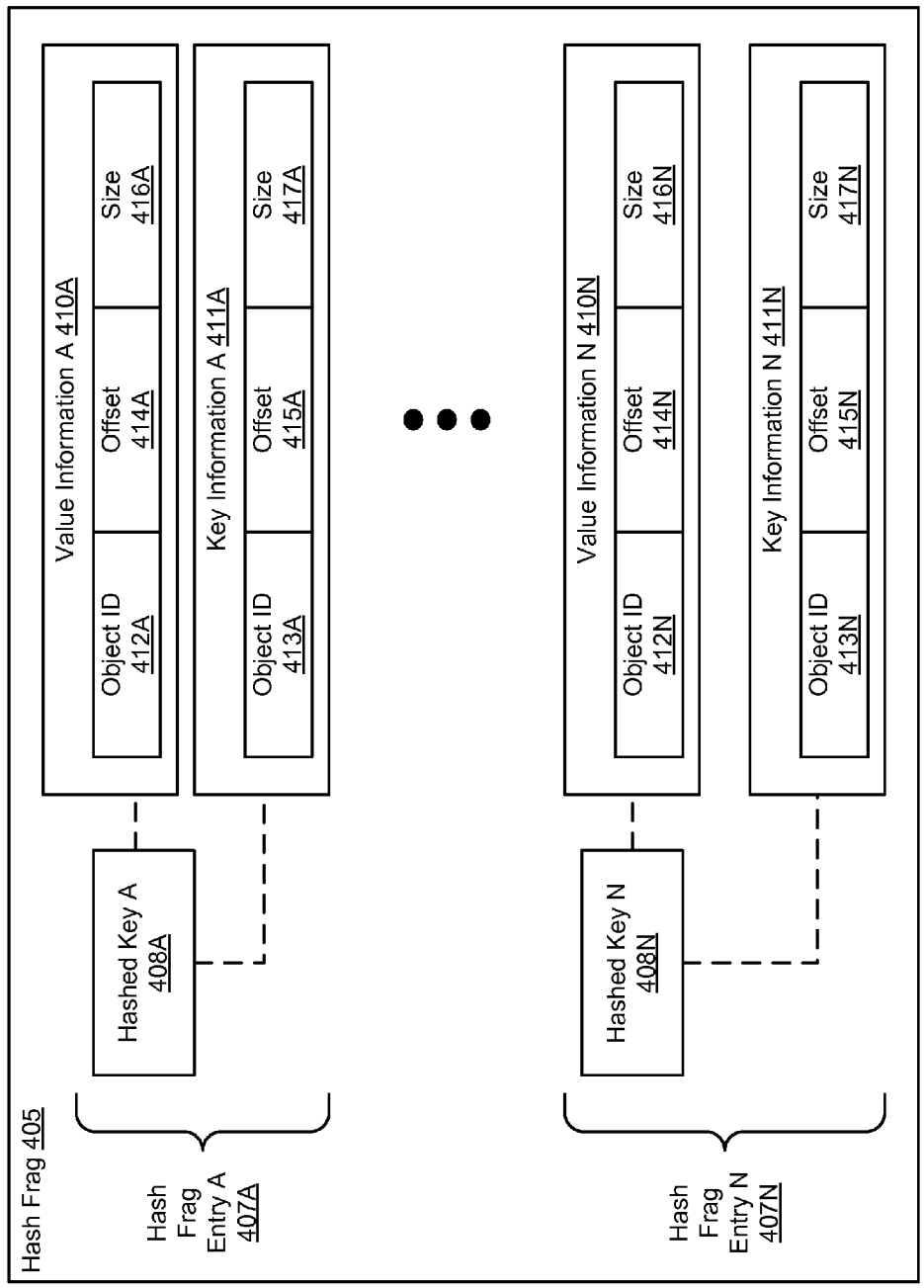

While FIGS. 4B and 4C describe hash frag entries that include a hashed key, which is obtained by hashing the original key, the hash frag entries may be implemented such that they include the original key as well as a hashed key. FIG. 4D shows an example of a hash frag that includes the original key.

Referring to FIG. 4D, FIG. 4D shows hash frag (405) in accordance with one or more embodiments of the invention. The hash frag (405) includes one or more hash frag entries (407A, 407N). Further, each hash frag entry (407A, 407N) may include a hashed key (408A, 408N), value information (410A, 410N), and key information (411A, 411N).

In one embodiment of the invention, the key information (411A, 411N) includes information about the location of a original key stored in a storage module. For example, the key information may include, but is not limited to, an object ID (413A, 413N), a offset (415A, 415N), and a size (417A, 417N) field configured to store the size of the original key. The key information (411A, 411N) may be used to retrieve the original key from a storage module. Those skilled in the art will appreciate that any logical address (and not just the object ID and offset) may be stored in the hash frag entry without departing form the invention. Though not shown in FIG. 4D, in one or more embodiments of the invention, the original key may be included in place of the key object in a manner similar to that including the full value as shown in FIG. 4C.

As discussed with respect to FIG. 4A, the hash object (400) includes one or more hash frags. As the number of keys and corresponding values stored by the storage appliance increases the number of hash frag entries and, consequently, number of hash frags increases. In one embodiment of the invention, the hash object may be conceptually viewed as a balanced binary tree (also referred to as a hash table) that includes hash frags as its leaves. The binary tree grows as the number of keys inserted grows and, in turn, the number of hash frags in the hash object grows. FIGS. 6C and 6D, below, describe embodiments of how the hash object grows over time.

Figure 4E:
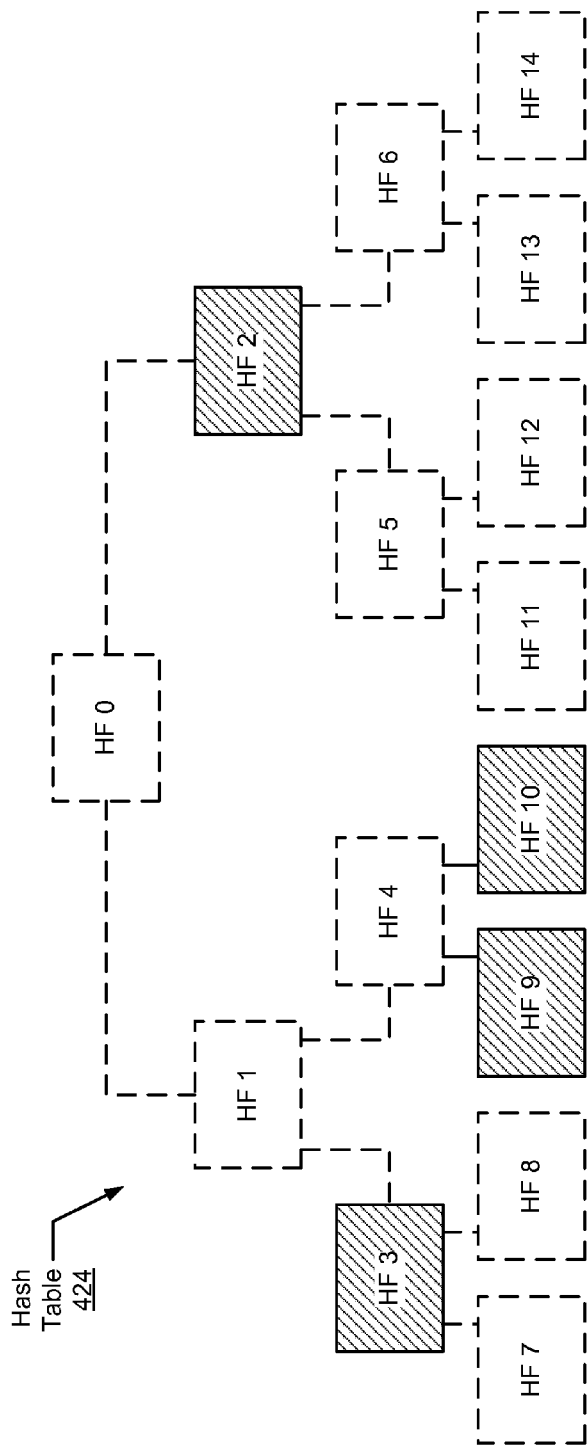
FIG. 4E shows a hash table in accordance with one or more embodiments of the invention.
Figure 4F:
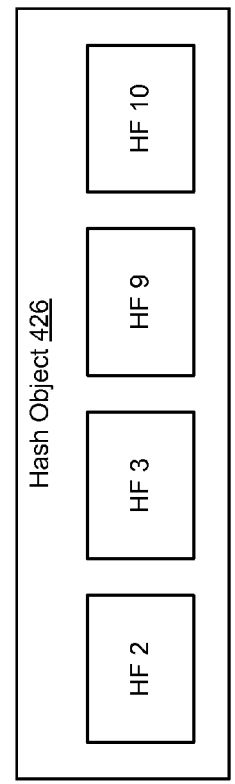
FIG. 4F shows a hash object corresponding to the hash table in accordance with one or more embodiments of the invention.

Referring to FIGS. 4E and 4F, FIG. 4E shows a hash table (424) in accordance with one or more embodiments of the invention. As discussed above, the hash table (424) may be conceptually viewed as balanced binary tree that is sparsely populated. For example, in FIG. 4E, the hash table (424) conceptually includes 15 nodes (HF 0-HF-14); however, only a subset of nodes (HF 2, HF 3, HF 9, HF 10) in the hash table (424) include actual hash frags. Referring to FIG. 4F, these hash frags collectively form the content of the hash object (426). FIGS. 6C and 6D, below, describe embodiments of how the hash object grows over time.

Figure 5:
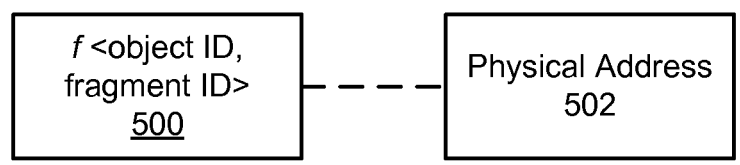
FIG. 5 shows a data structure in accordance with one or more embodiments of the invention.

FIG. 5 shows a data structure in accordance with one embodiment of the invention. The control module may include one or more such data structures to implement the invention. In one embodiment of the invention, the data structure is an in-memory data structure that tracks the mappings between data provided by the client and the physical address of such data in the storage modules. In one embodiment of the invention, data structure includes one or more entries where each entry associates a logical address e.g., <object ID, fragment ID> (500), which identifies the data from the perspective of the client, and a physical address (502), which identifies the location of the data within a storage module. In one embodiment of the invention, the contents of the entry may be derived by applying a function (e.g., MD5, SHA 1, a table lookup, etc.) to <object ID, fragment ID>. Those skilled in the art will appreciate that any injective function may be used without departing from the invention. Further, those skilled in the art will appreciate that any form of logical address may be used without departing the invention.

FIGS. 6A-6D show flowcharts in accordance with one or more embodiments of the invention. More specifically, FIGS. 6A-6D show a method for storing data in a storage appliance in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, one or more steps shown in FIGS. 6A-6D may be performed in parallel with one or more other steps shown in FIGS. 6A-6D.

Figure 6A:
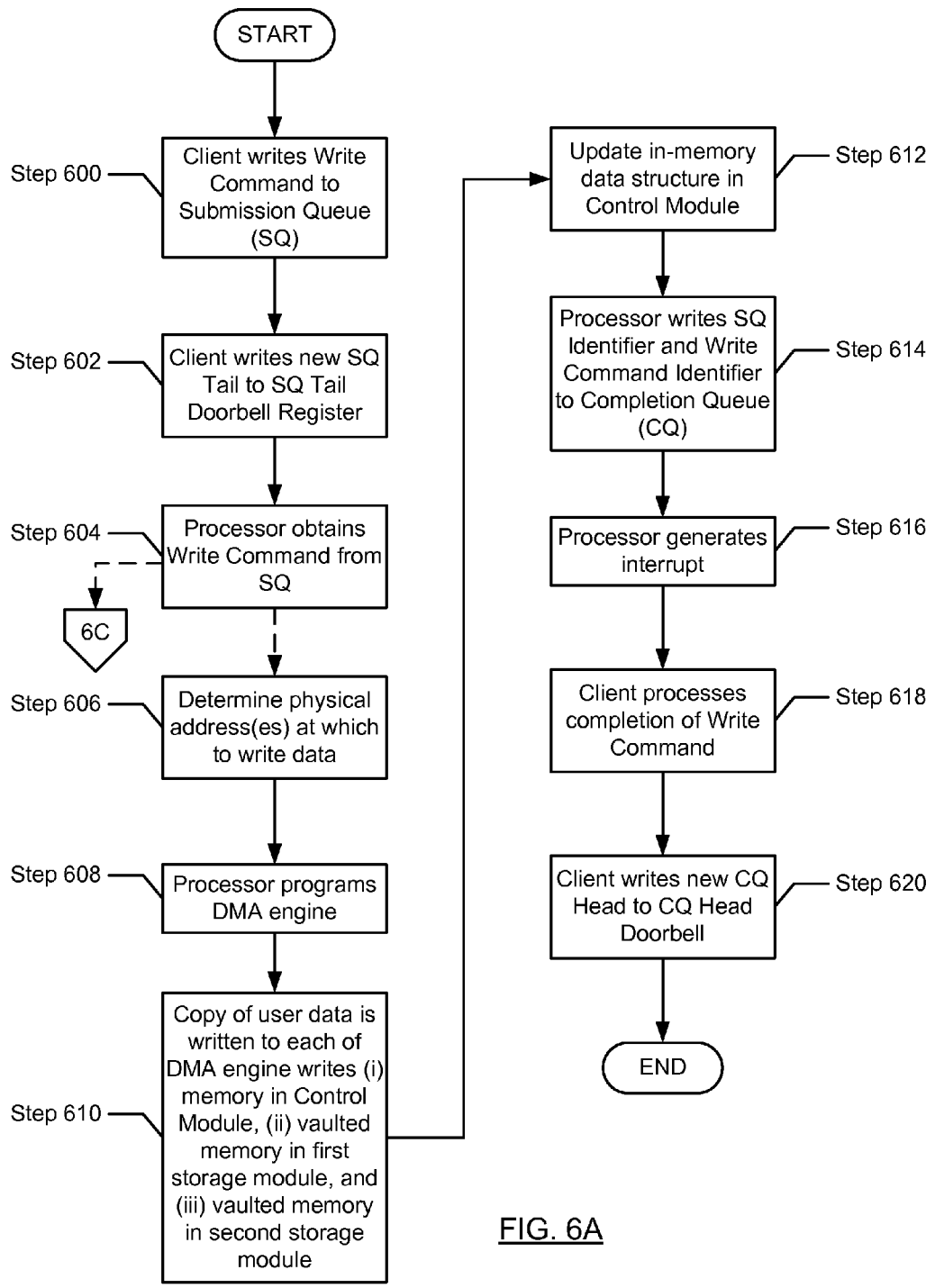
FIGS. 6A-6D show flowcharts for writing keys and values in accordance with one or more embodiments of the invention.
Figure 6B:
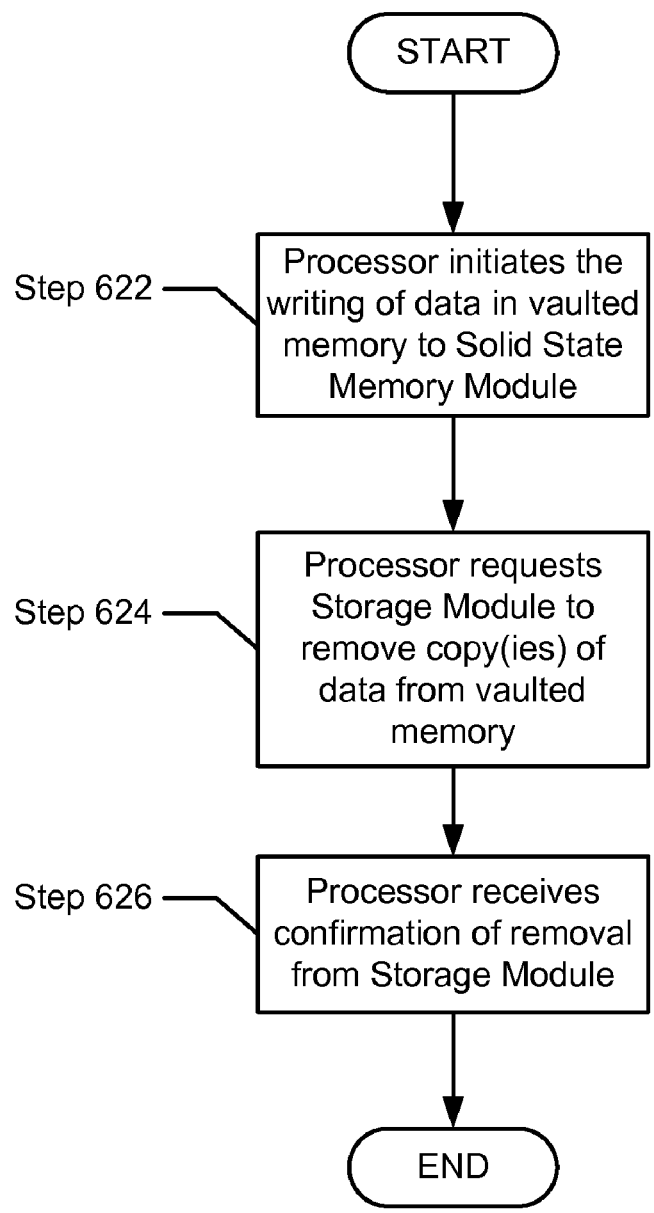
Figure 6C:
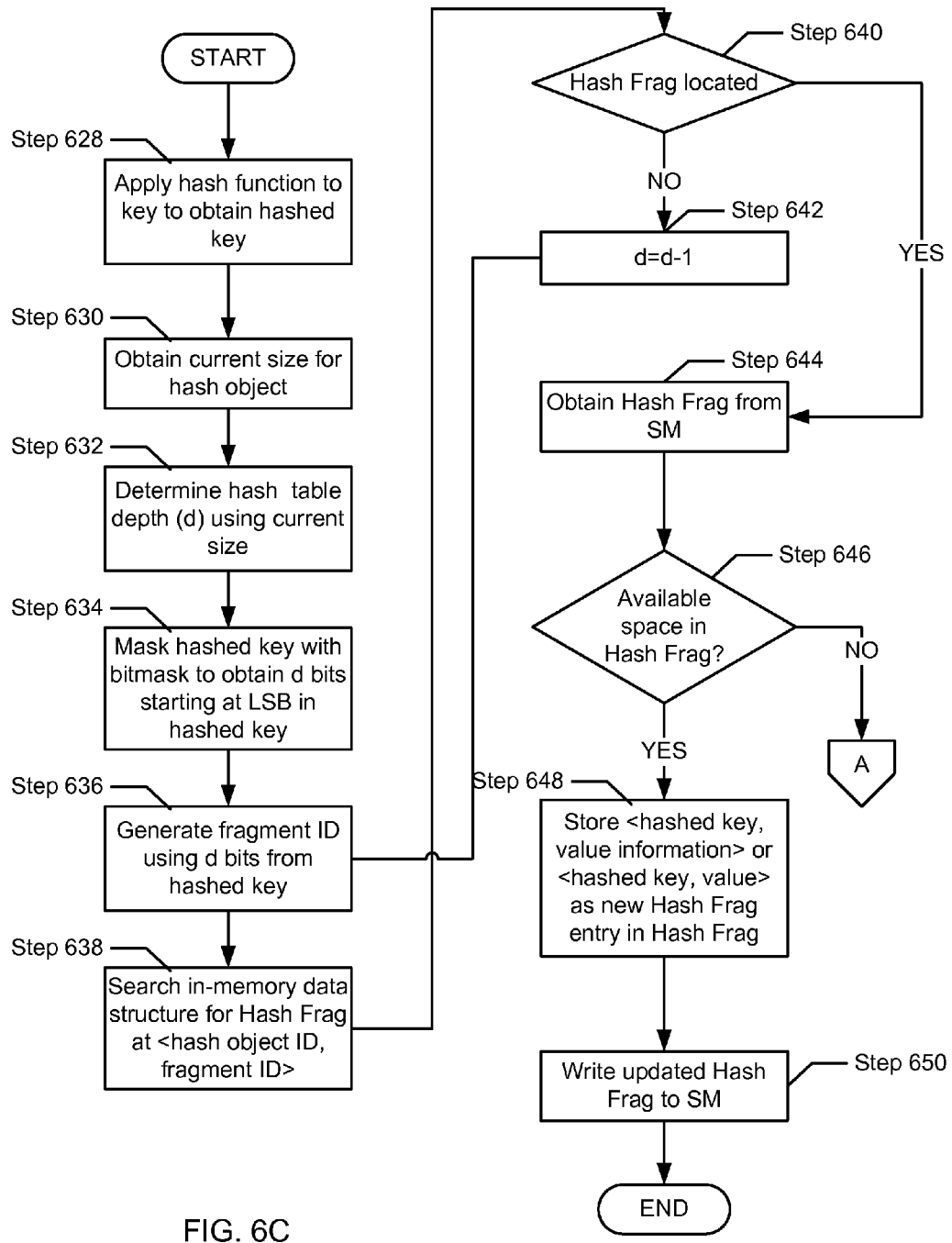
Figure 6D:
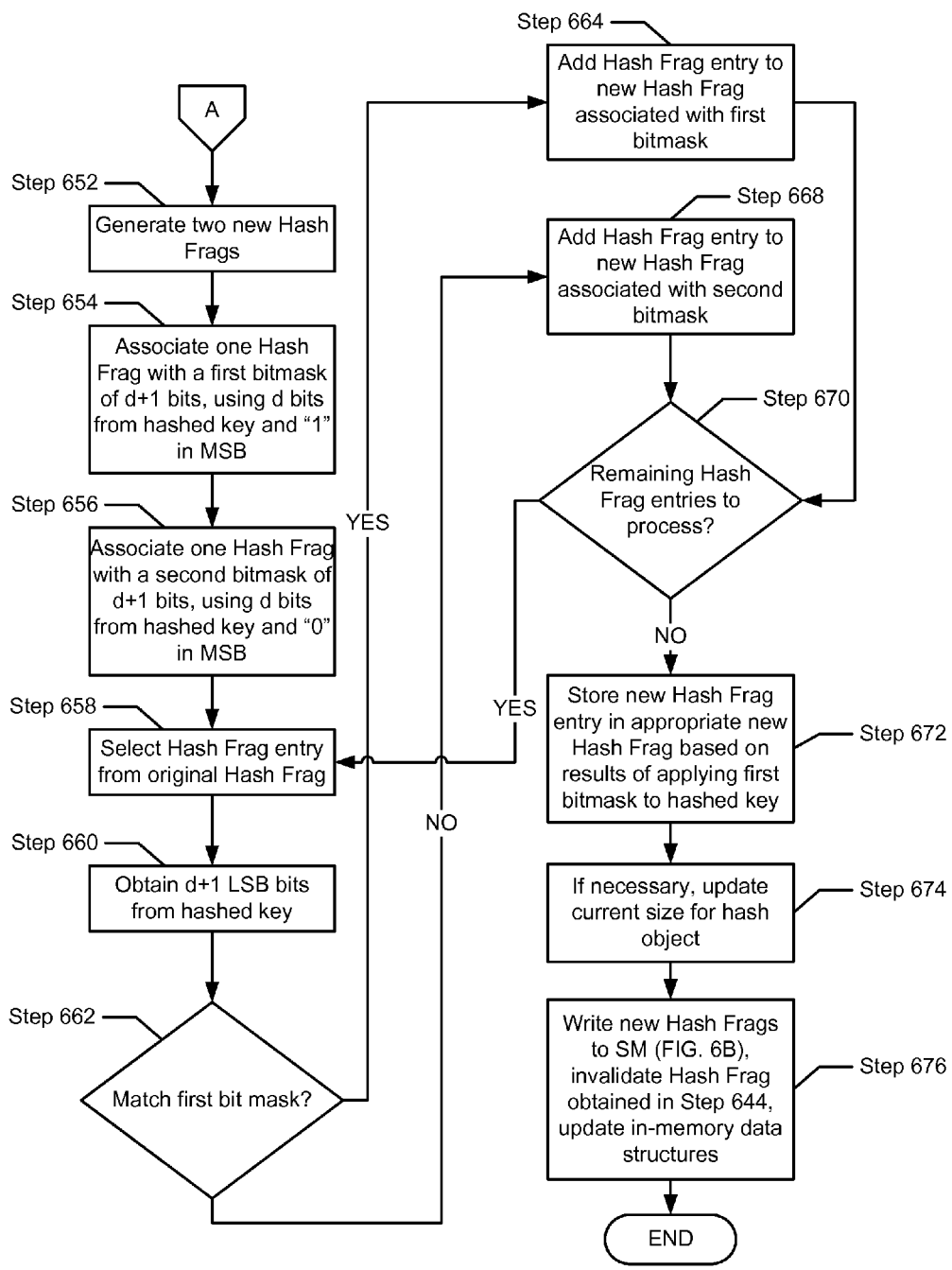

Briefly, FIG. 6A shows a method for receiving a write request and processing the write request in accordance with one or more embodiments of the invention. FIG. 6B shows a method for storing data (i.e., values) in persistent storage in accordance with one or more embodiments of the invention. FIGS. 6C and 6D show a method for scaling the hash object in accordance with one or more embodiments of the invention.

Referring to FIG. 6A, in step 600, the client writes a write command (write request) to the submission queue (SQ) of the processor in a control module (208 in FIG. 2A). In one embodiment of the invention, the write command specifies a key and a value. In another embodiment of the invention, the write command specifies a key and value information. In one embodiment of the invention, the write command passes through at least the client switch and the switch fabric prior to reaching the SQ of the processor. Those skilled in the art will appreciate that the write command may include a hashed key instead of the original key without departing from the invention. In such scenarios, various steps in FIGS. 6A-6D, e.g., Step 628, may be omitted.

In step 602, client writes a new SQ tail to the SQ Tail doorbell register. In one embodiment of the invention, by writing to the SQ Tail doorbell register, the client notifies the processor that there is a new command to process in its submission queue.

In step 604, the processor obtains the write command from the SQ. If the write command includes a key and a value, then the process proceeds to FIG. 6C. Alternatively, if the write command includes a key and value information, then the key portion of the write command is processed in accordance with FIG. 6C and the value information may be processed in accordance with FIG. 6A—namely, proceeding to Step 606.

In step 606, the processor determines the physical address(es) in which to write the value corresponding to the value information. In one embodiment of the invention, the physical address(es) corresponds to a location in the solid state memory module. In one embodiment of the invention, the processor selects two physical addresses in which to write copies of the value, where each of the physical addresses is in a separate solid state memory module.

In step 608, the processor programs the DMA engine to issue a write to a multicast address. In one embodiment of the invention, the multicast address is associated with a multicast group, where the multicast group specifies a first memory location in the memory in the control module, a second memory location in a first vaulted memory, and a third memory location in a second vaulted memory. In one embodiment of the invention, the first vaulted memory is located in the same storage module as the solid state memory module that includes the physical address specified by the processor. In one embodiment of the invention, the second vaulted memory is determined in a similar manner. In one embodiment of the invention, there is one vaulted memory location selected for each physical address identified by the processor in step 606.

In step 610, the DMA engine reads the value from the source address (derived from the value information) in client memory, and writes the value to the multicast address as directed by the control module. In one embodiment of the invention, a switch in the switch fabric is associated with the multicast address. Upon receipt of the address, the switch performs the necessary translation on the multicast address to obtain three addresses—one to each of the aforementioned memory locations. The switch subsequently sends copies of the value to the three memory locations. Those skilled in the art will appreciate that the particular switch which implements multicast may vary based on the implementation of the switch fabric. In this embodiment, there is only one write issued between the client and the storage appliance.

In another embodiment of the invention, in Step 608, the processor programs the DMA engine to issue three write requests in parallel—one to each of the memory locations in the multicast group. In this embodiment, in Step 610, DMA engine issues the three write requests in parallel. In this embodiment, there are three writes issued between the client and the storage appliance.

Continuing with FIG. 6A, in step 612, the processor updates the in-memory data structure to reflect that three copies of the value are stored in the storage appliance. In step 614, the processor writes the SQ Identifier (which identifies the SQ of the processor) and a Write Command Identifier (which identifies the particular write command the client issued to the processor) to the completion queue (CQ) of the client.

In step 616, the processor generates an interrupt for the client processor. In one embodiment of the invention, the processor uses the doorbell interrupts provided by the non-transparent bridge to issue an interrupt to the client processor. In step 618, the client processes the data in its CQ. At this stage, the client has been notified that the write request has been serviced. In step 620, once the client has processed the data at the head of the completion queue, the client writes a new CQ head to the CQ head doorbell. This signifies to the processor the next location in the CQ to use in future notifications to the client.

FIG. 6B shows a flowchart for writing data in the storage module memory to solid state storage in accordance with one or more embodiments of the invention. In step 622, the processor in the control module initiates the writing of a value (previously stored in accordance with FIG. 6A) from the vaulted memory to the physical address identified in step 606. In one embodiment of the invention, the processor in the control module programs a DMA engine in the storage module controller to read data from the vaulted memory and to write a copy of this data to a physical address in the solid state memory module.

In step 624, following step 622, the processor in the control module requests that all copies of the value in vaulted memory that correspond to the value written to the solid state memory module in step 622 are removed. In step 626, a confirmation of the removal is sent to the processor in the control module by each of the storage modules that included a copy of the value (written in step 610) in their respective vaulted memories.

FIGS. 6C and 6D show a method for processing a key in accordance with one or more embodiments of the invention. In Step 628, a hash function, e.g., SHA-2 is applied to the key to obtain a hashed key. Any hash function capable of mapping an arbitrarily sized key to a unique fixed-size value may be used without departing from the invention. Further, those skilled in the art will appreciate that the same hash function is used for processing all keys stored in a given hash table (e.g., 424 in FIG. 4E); however, if there are multiple hash tables in the storage appliance—each of the hash tables may be implemented using a different hash function.

In Step 630, the current size for the hash object is obtained. In Step 632, the hash table depth (d) is determined using the current size. More specifically, as discussed above, because the hash table may be conceptually viewed as a balanced binary tree, d may be determined using the current size and the hash frag size. In particular, the current size may be divided by the hash frag size to determine the theoretical number of leaves on the hash table (e.g., number of leaves= (current size/hash frag size)+1). Using this information and the fact that the hash table is a conceptual balanced binary tree, the hash table depth (d) may be determined.

In Step 634, the hashed key is masked with bit mask to obtain d bits from the hashed key, where the d bits are the least significant bits in the hashed key. In one embodiment of the invention, the bit mask may be ANDed with the hashed key to obtain the d bits. More specifically, the d Least Significant Bits (LSB) from the result of applying the bit mask to the hashed key are obtained. In Step 636, the fragment ID is generated using these d bits. In one embodiment of the invention, these d bits are directly used as the fragment ID. Those skilled in the art will appreciate that any injective function may be used to map this set of d bits to a fragment ID without departing from the invention.

In Step 638, the in-memory data structure (see e.g., FIG. 5) is searched to determine whether a hash frag identified with <object ID, fragment ID (obtained in Step 636)> is present. In one embodiment of the invention, a function is applied to <hash object ID, fragment ID> to obtain a value. The value is then used to perform a look-up in the in-memory data structure to determine whether there is a corresponding entry. If there is a corresponding entry, the hash frag is present. If there is no corresponding entry, then the hash frag is not present.

In Step 640, a determination is made about whether the hash frag has been located. Said another way, a determination is made about whether there an entry in the in-memory data structure corresponding to the hash frag (which is identified by hash object ID, fragment ID>). If the hash frag is located, the process proceeds to Step 644; otherwise, the process proceed to Step 642.

In Step 642, d is set to d−1. The process then proceeds to Step 636.

In Step 644, the hash frag is obtained. In one embodiment of the invention, the hash frag may be obtained from the solid state storage module using the corresponding physical address in the in-memory data structure (see e.g., FIG. 5). Alternatively, the control module may obtain the hash frag from memory (e.g., 210) if the hash frag is present in the memory.

In Step 646, a determination is made about whether the hash frag includes sufficient space to store a new hash frag entry. In one embodiment of the invention, the hash frag has a maximum size and, once reached, cannot store any additional hash frag entries. If the hash frag includes sufficient space to store the hash frag entry, the process proceeds to Step 648; otherwise, the process proceeds to Step 652 in FIG. 6D.

In Step 648, the <hashed key, value information> or <hashed key, value> is stored in a new hash frag entry in the hash frag to generate an updated hash frag. In one embodiment of the invention, the value information is obtained by the control module prior to populating the new hash frag entry. In Step 650, the updated hash frag is written to a solid state storage in a storage module.

If the hash frag obtained in Step 644 does not have sufficient space to store the new hash frag entry, then new hash frags are created in populated in accordance with the following steps.

Referring to FIG. 6D, in Step 652, two new hash frags are created. In Step 654, a first new hash frag is associated with a bit mask of length d+1, where d corresponds to d set in Step 632 or to d set during last execution of step 642 used to obtain the hash frag in Step 644. Further, the content of the first bit mask is the d bits used to generate the fragment ID in step 636 with addition of a "1" in the most significant bit (MSB) position. For example, if the last d bits to generate the fragment ID were "01", then the new bit mask associated with the first new hash frag is "101."

In Step 656, a second new hash frag is associated with bit mask of length d+1, where d corresponds to d set in Step 632 or to d set during last execution of step 642 used to obtain the hash frag in Step 644. Further, the content of the bit mask is d bits used to generate the fragment ID in step 636 with addition of a "0" in the MSB position. For example, if the last d bits to generate the fragment ID were "01", then the new bit mask associated with the second new hash frag is "001."

In Step 658, a hash frag entry from the hash frag obtained in Step 644 is obtained.

In Step 660, d+1 LSB from the hashed key in the hash frag entry obtained in step 658 are obtained. For example, if the hashed key is 0101011100001 and d+1=3, then 001 is obtained. In Step 662, a determination is made about whether the d+1 LSB bits obtained in Step 660 match the first bit mask. If the d+1 LSB bits obtained in Step 660 match the first bit mask, then the process proceeds to Step 664; otherwise, the process proceeds to Step 668. In Step 664, the hash frag entry from Step 658 is stored in the hash frag associated with the first bit mask. In Step 668, the hash frag entry from Step 658 is stored in the hash frag associated with the second bit mask.

In Step 670, a determination is made about whether there are any remaining hash frag entries in the hash frag obtained in Step 644 to process. If there are remaining hash frag entries in the hash frag obtained in Step 644 to process, the process proceeds to Step 658; otherwise, the process proceeds to Step 672.

In Step 672, a new hash frag entry for the key obtained in Step 628 is stored in one of the new hash frags based on the hash value of the key and the first bit mask. In Step 674, the current size for the hash object is updated. This step is only performed if the new hash frags result in an increase of the depth of the conceptual hash tree table. In Step 676, the new frags are stored in solid state storage and the in-memory data structures are updated to reflect the two new hash frags in the hash object. Further, the hash frag obtained in step 644 is removed (or otherwise invalidated in the solid state memory) and the in-memory data structure is updated to remove the entry corresponding to the now removed (or otherwise invalidated) hash frag.

FIGS. 7A-7D show an example of storing data in a storage appliance in accordance with one or more embodiments of the invention. The example is not intended to limit the scope of the invention. Further, various components in the client and storage appliance have been omitted for purposes of clarity in the FIGS. 7A-7D.

Figure 7A:
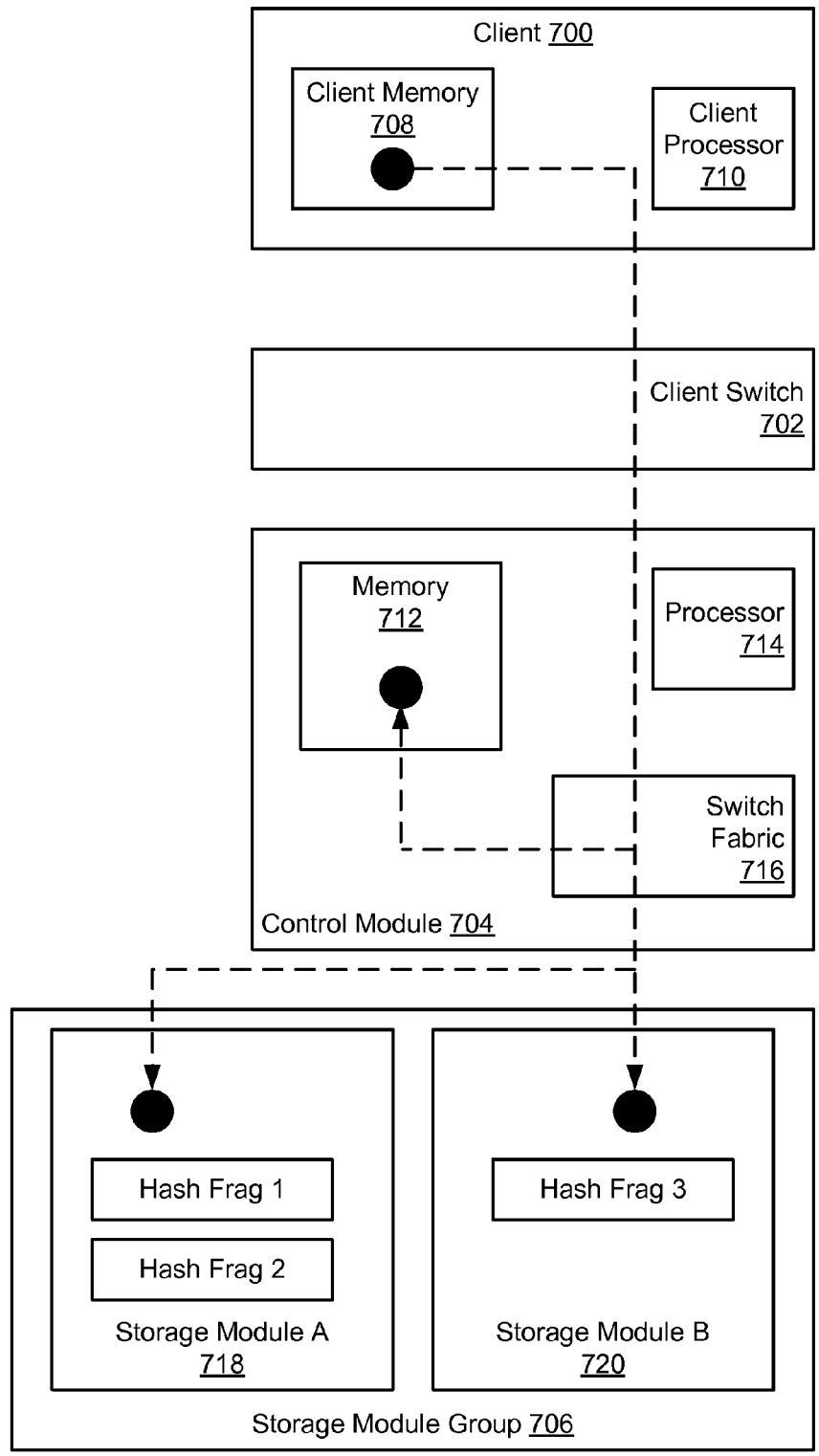
FIGS. 7A-7D show an example in accordance with one or more embodiments of the invention.

Turning to FIG. 7A, consider the scenario in which the client (700) issues, via the client processor (710), a write command with a key and a value (denoted by the black circle) to the storage appliance, where the value was not previously stored in the storage appliance. In response to receiving the command, the processor (714) in the control module (704) determines that a first copy of the value should be written to a first physical location in storage module A (718) and that a second copy of the value should be written to a second physical location in storage module B (720).

Based on this determination, the processor (714) creates a multicast group with three members. A first member has a destination address in vaulted memory (not shown) in storage module A (718), the second member has a destination address in vaulted memory (not shown) in storage module B (720), and the third member has a destination address in memory (712). As shown in FIG. 7A, storage module A (718) and storage module B (720) are part of a storage module group (706). The processor (714) subsequently programs the switch (not shown) in the switch fabric (716) to implement the multicast group.

The DMA engine (not shown) proceeds issue a write to a multicast address associated with the multicast group. The write is transmitted, via the client switch (702), to the switch fabric and ultimately reaches the switch (not shown) that implements the multicast group. The switch subsequently creates three writes (one to each of the destinations specified by the multicast group) and issues the writes to the target memory locations. In one embodiment of the invention, the three writes occur in parallel.

The copies of the value to be written at the various destination addresses pass through the switch fabric (716). Once the writes are complete, there are three copies of the value in the storage appliance. Once the writes are complete, the in-memory data structure (not shown) in the memory (712) is updated to reflect that the value is stored in three locations within the storage appliance.

Figure 7B:
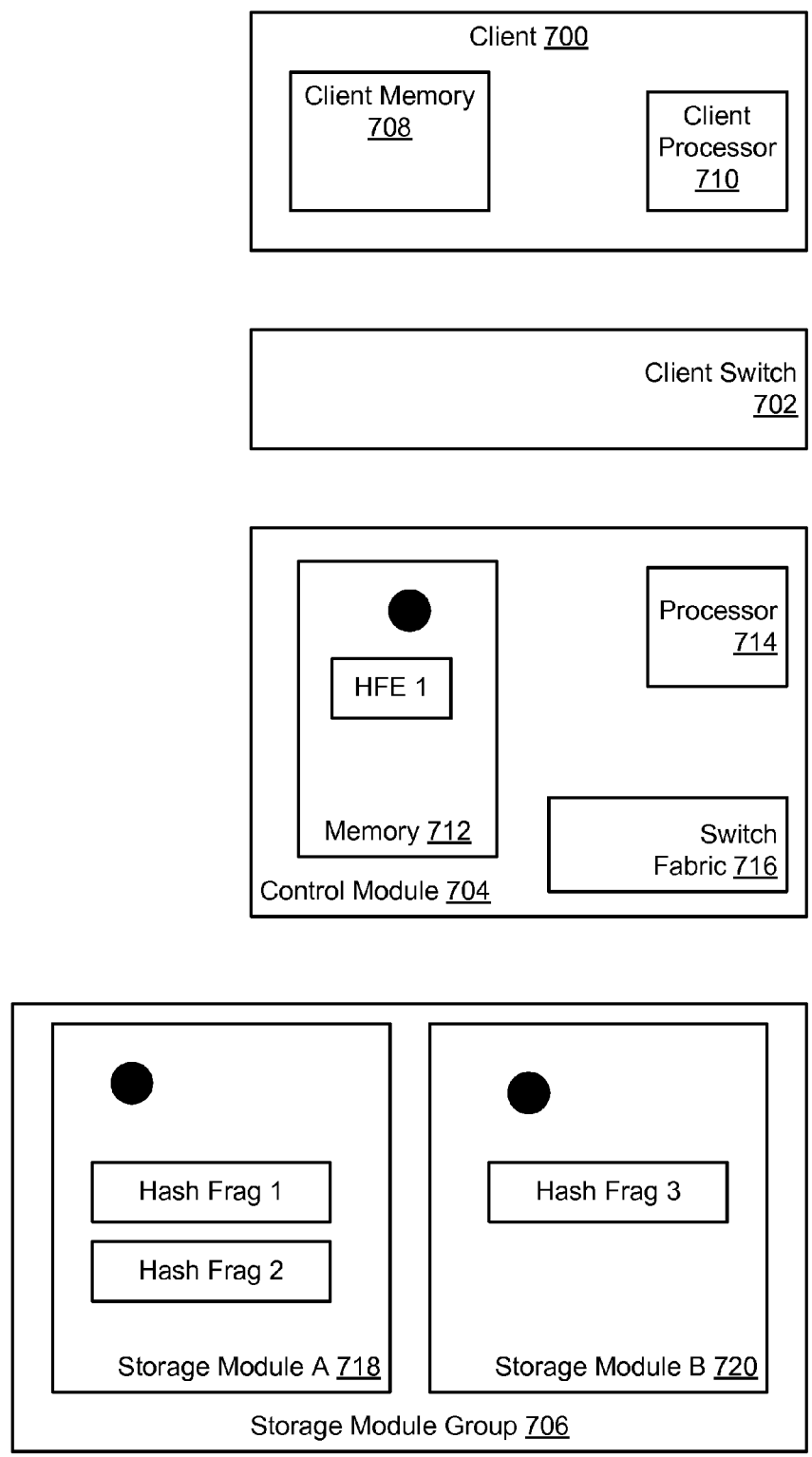
Figure 7C:
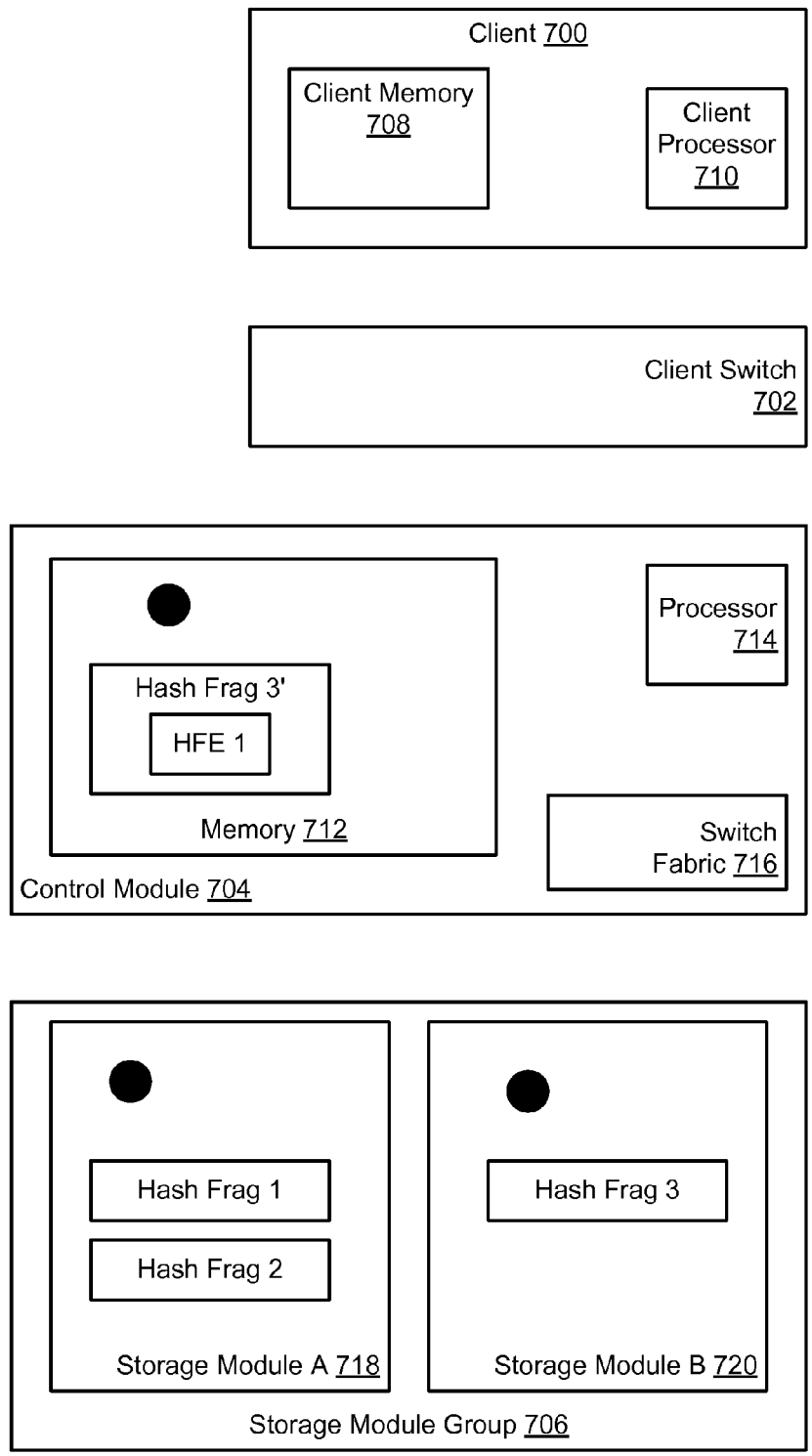

Referring to FIG. 7B, after copying the value in to the storage appliance, the storage appliance identifies Hash frag 3 as the target for hash frag entry (HFE 1), which will include a hashed key and value information for the aforementioned value. Referring to FIG. 7C, at some later point in time, hash frag 3 is obtained from storage module B and updated to include HFE 1.

Figure 7D:
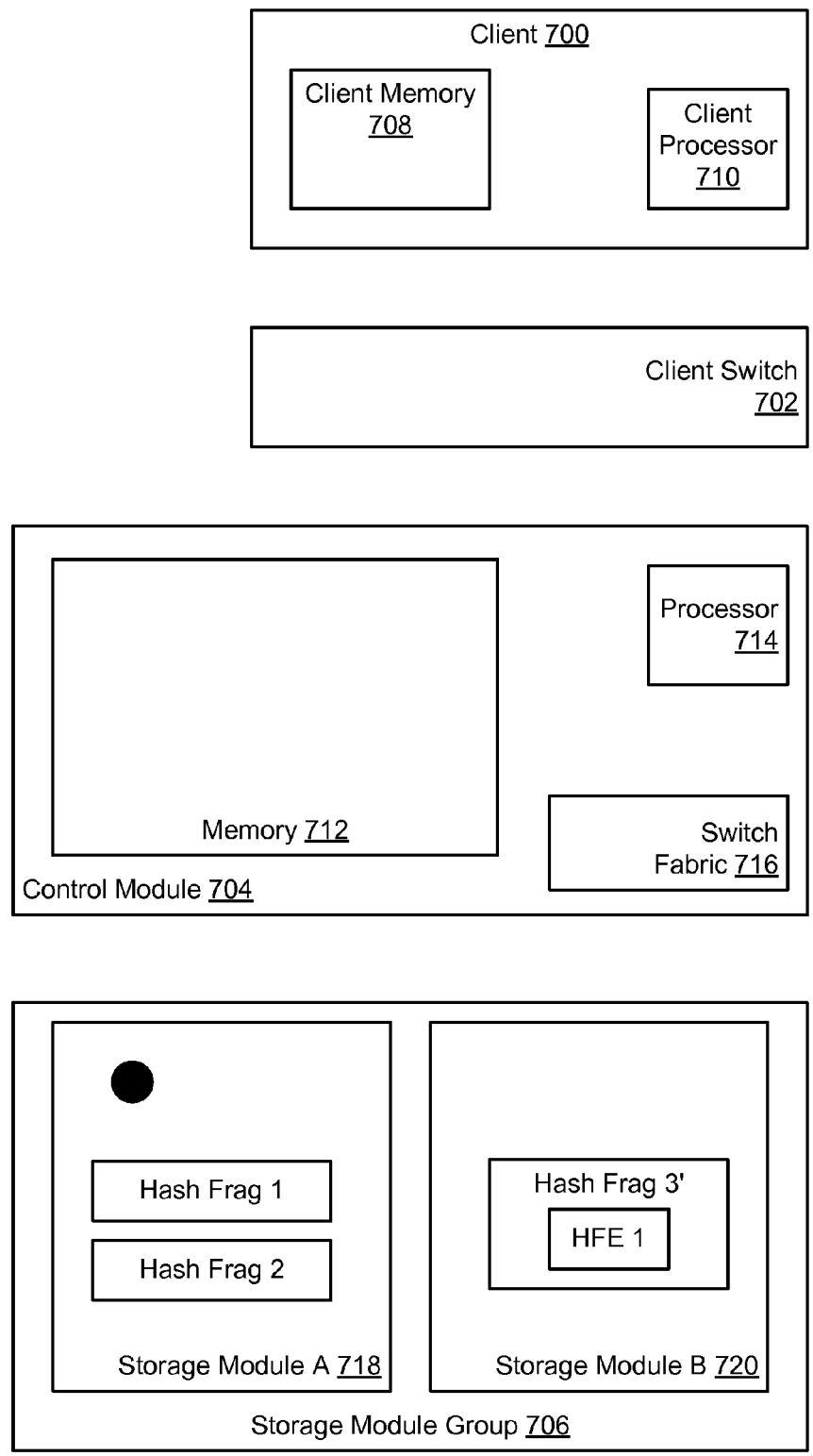

Referring to FIG. 7D, for purposes of this example assume that the copy of the value is now stored in a solid state memory module (not shown) in storage module A, that the updated hash frag 3 has been written to a solid state memory module (not shown) in storage module B, and that hash frag 3 has been invalidated (or otherwise removed from the storage appliance). At this point, the processor (714) may issue a request to all storage modules that include a copy of the value in vaulted memory to remove the copy of the value from their respective vaulted memories. The storage modules each notify the control module upon completion of this request. FIG. 7D shows the state of the system after all storage modules have completed this request and after hash frag 3 has been deleted from the storage appliance. The processor (714) may update the in-memory data structure upon receipt of the notification from the storage modules that all copies of the values in vaulted memory have been removed. In addition, the in-memory data structure is updated to include an entry for hash frag 3' and to remove the entry from hash frag 3.

Figure 8A:
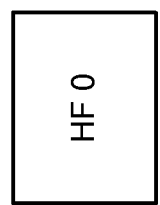
FIGS. 8A-8D show an example in accordance with one or more embodiments of the invention.

FIGS. 8A-8D show an example in accordance with one or more embodiments of the invention. The example is not intended to limit the scope of the invention. Referring to FIG. 8A, initially, the hash object is represented by a root of a conceptual binary tree. At this stage, all hash frag entries are located in HF 0 and the hash object only includes a single hash frag (i.e., HF 0). In one embodiment of the invention, when a new hash object is created, it is initialized with one empty hash frag (e.g., HF 0). This ensures that even a hash object with no hash frag entries will include at least one hash frag thereby guaranteeing that the search shown in FIG. 6C will terminate.

Figure 8B:
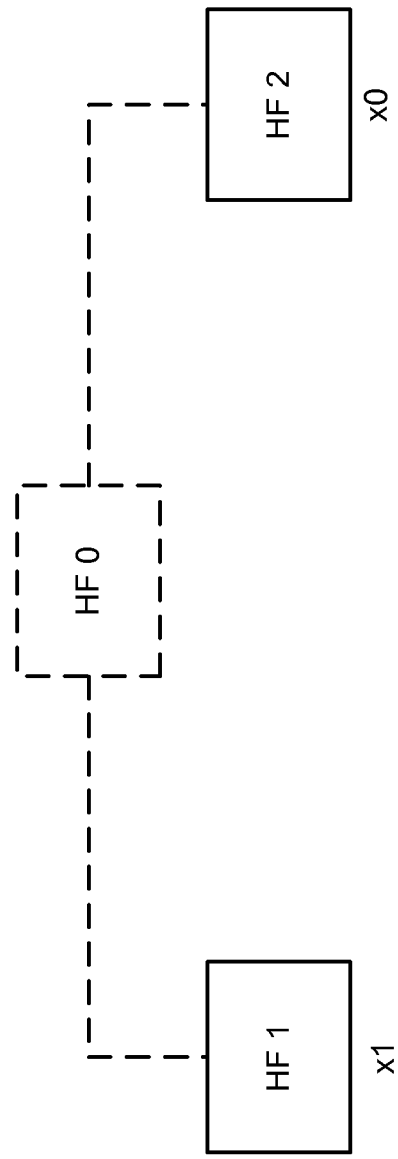

Referring to FIG. 8B, when HF 0 cannot store any additional hash frag entries, two new hash frags are created (HF 1, HF 2). HF 1 is associated with a bit mask of 1 and HF 2 is associated with a bit mask of 0. Each hash frag entry in HF 0 that includes a "1" in the LSB of the hashed key is stored in HF 1 and each hash frag entry in HF 0 that includes a "0" in the LSB of the hashed key is stored in HF 2. At this stage, the hash object includes two hash frags—HF 1 and HF 2. HF 0 is no longer part of the hash object.

Figure 8C:
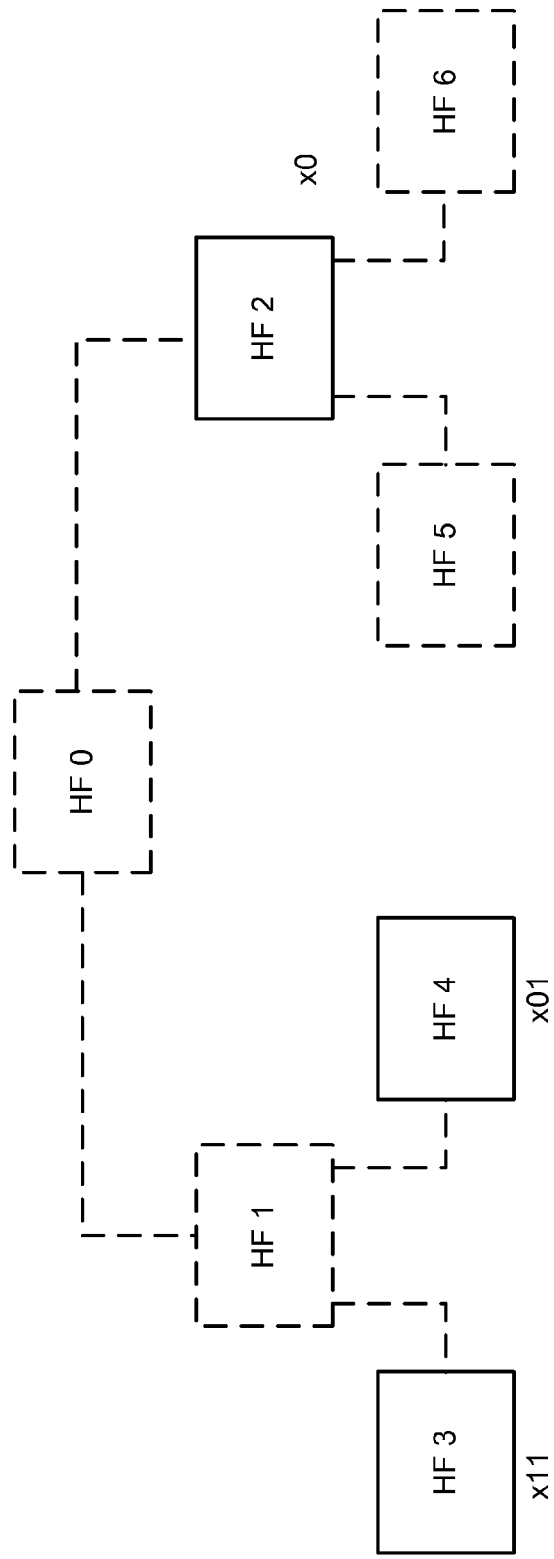

Referring to FIG. 8C, when HF 1 cannot store any additional hash frag entries, two new hash frags are created (HF 3, HF 4). HF 3 is associated with a bit mask of 11 and HF 3 is associated with a bit mask of 01. Each hash frag entry in HF 1 that includes "11" in the two LSBs of the hashed key is stored in HF 3 and each hash frag entry in HF 1 that includes a "01" in the two LSB of the hashed key is stored in HF 1. At this stage, the hash object includes three hash frags—HF 3, HF 4 and HF 2. HF 1 is no longer part of the hash object. As shown in FIG. 8C, after HF 3 and HF 4 are created, the hash tree table conceptually includes HF 5 and HF 6—though no data is stored in these leaves. Further, while the hash tree table is conceptually balanced, only three nodes in the hash tree table—HF 3, HF 4 and HF 2—include data with all other nodes remaining empty.

Figure 8D:
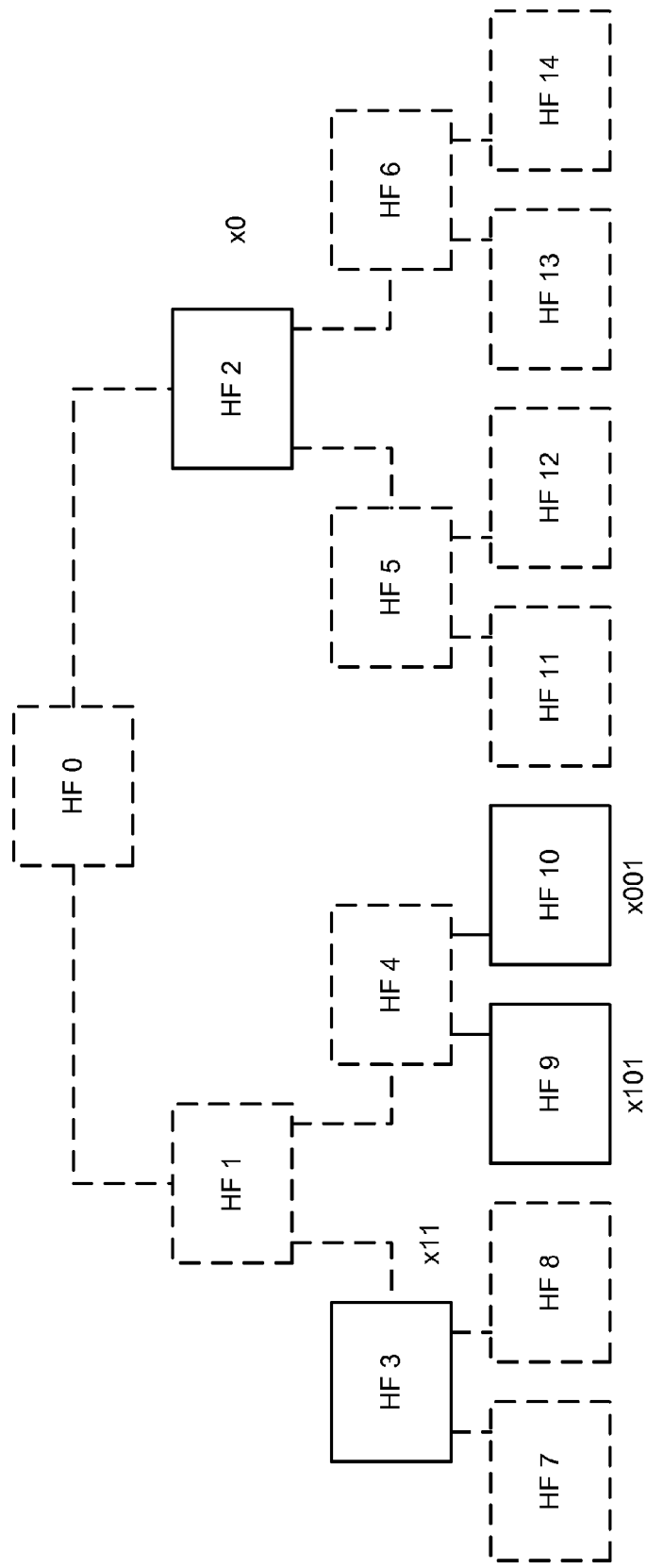

Referring to FIG. 8D, when HF 4 cannot store any additional hash frag entries, two new hash frags are created (HF 9, HF 10). HF 9 is associated with a bit mask of 101 and HF 10 is associated with a bit mask of 001. Each hash frag entry in HF 4 that includes a "101" in the three LSBs of the hashed key is stored in HF 9 and each hash frag entry in HF 4 that includes a "001" in the three LSBs of the hashed key is stored in HF 4. At this stage, the hash object includes four hash frags—KEF 3, HF 9, HF 10, and HF 2. HF 4 is no longer part of the hash object. As shown in FIG. 8D, after HF 3 and HF 4 are created, the hash tree table conceptually includes HF 7, HF 8, HF 11, HF 12, HF 13, HF 14—though no data is stored in these leaves. Further, while the hash tree table is conceptually balanced, only four nodes in the hash tree table—HF 3, HF 9, HF 10, and HF 2—include data with all other nodes remaining empty.

Figure 9A:
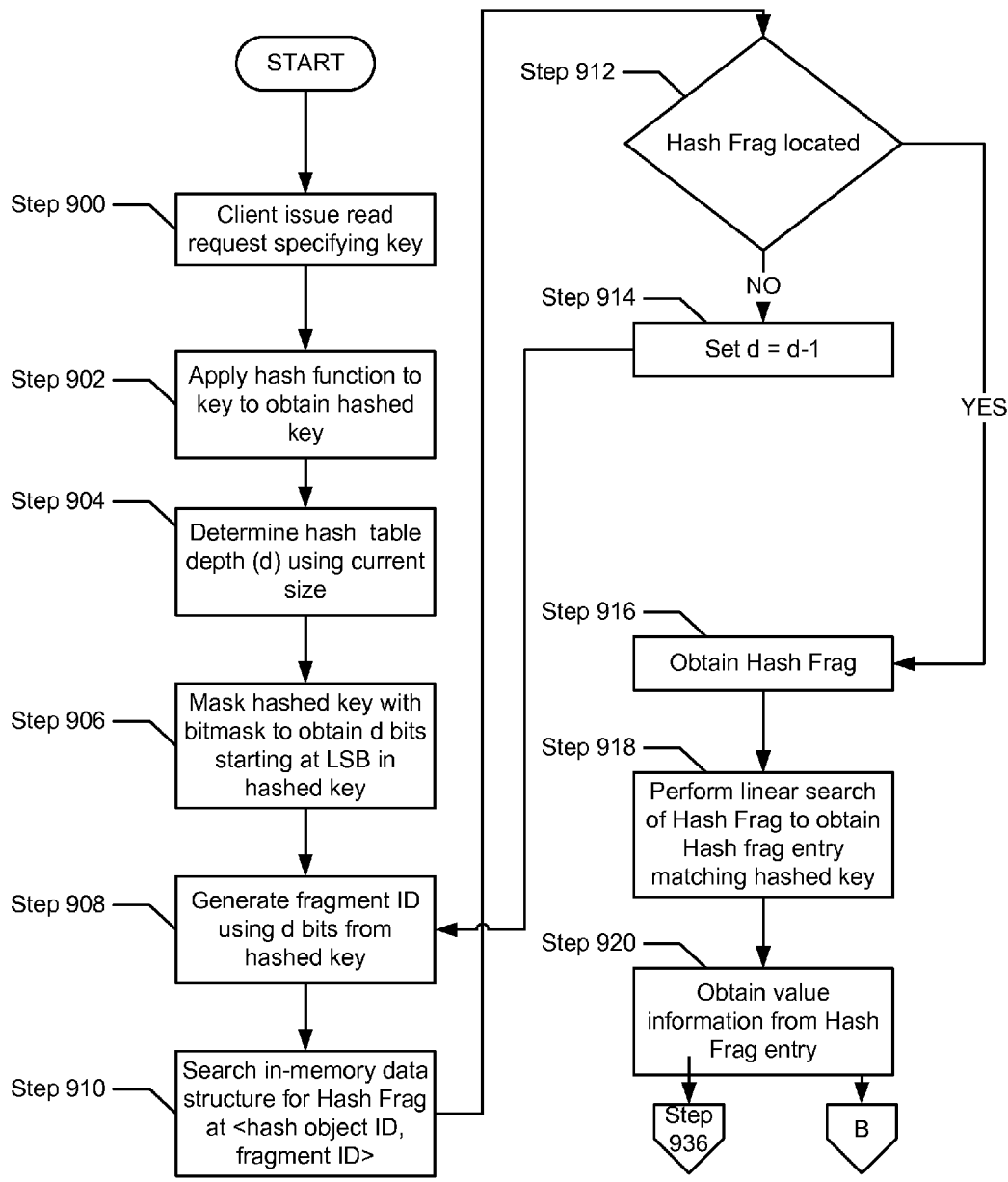
FIGS. 9A-9B show flowcharts for reading keys and values in accordance with one or more embodiments of the invention.
Figure 9B:
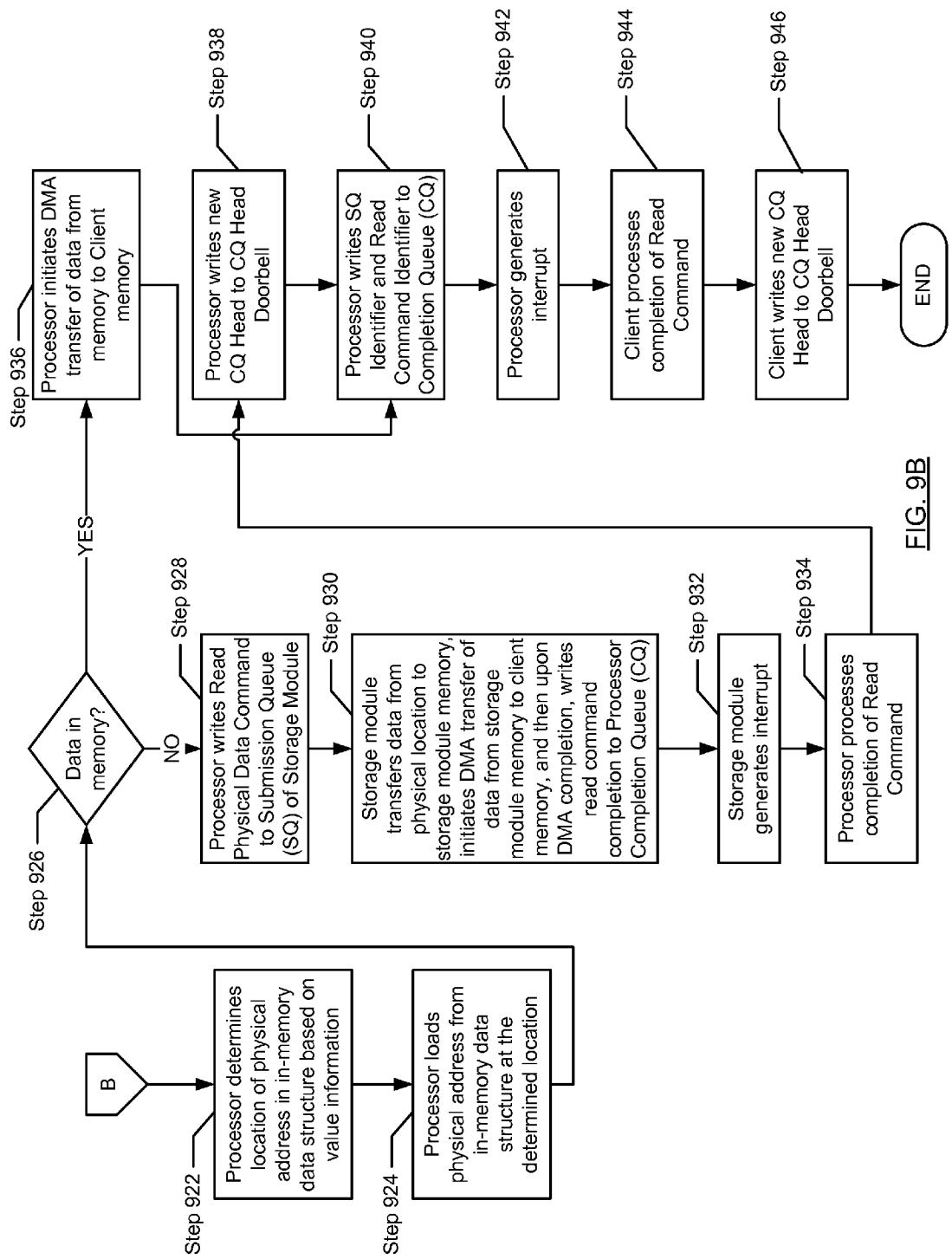

FIGS. 9A-9B shows a flowchart in accordance with one or more embodiments of the invention. More specifically, FIGS. 9A-9B show a method for reading data from a storage appliance in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In step 900, the client issues a read command that specifies a key. More specifically, in one embodiment of the invention, the client writes a Read Command (read request) to the submission queue (SQ) of the processor in the control module. In one embodiment of the invention, the read command includes a key. The client subsequently writes a new SQ tail to the SQ Tail doorbell register. In one embodiment of the invention, by writing to the SQ Tail doorbell register, the client notifies the processor that there is a new command to process in its submission queue. In response, the processor obtains the read command from the SQ.

In Step 902, a hash function, e.g., SHA-2 is applied to the key to obtain a hashed key. Any hash function may be used without departing from the invention. Those skilled in the art will appreciate that the same hash function that was used to insert keys into the hash object is used in Step 902. In Step 904, the hash table depth (d) is determined using the current size. More specifically, as discussed above, because the hash table may be conceptually viewed as balanced binary tree, d may be determined using the current size and the hash frag size. In particular, the current size may be divided by the hash frag size to determine the theoretical number of leaves on the hash table. Using this information and the fact that the hash table is a conceptual balanced binary tree, the hash table depth (d) may be determined.

In Step 906, the hashed key is masked with a bit mask to obtain d bits from the hashed key, where the d bits are the LSBs in the hashed key. In one embodiment of the bit mask may be ANDed with the hashed key to obtain the d bits. In Step 908, generate fragment ID using d bits. In one embodiment of the invention, the fragment ID is the value generated by applying the bit mask to the hashed key.

In Step 910, the in-memory data structure (see e.g., FIG. 5) is searched using a hash object ID and the fragment ID (obtained in Step 908). In one embodiment of the invention, a function is applied to <object ID, fragment ID> to obtain a value. The value is then used to perform a look-up in the in-memory data structure to determine whether there is a corresponding entry. If there is a corresponding entry, the hash frag is present. If there is no corresponding entry, then the hash frag is not present.

In Step 912, a determination is made about whether the hash frag has been located. Said another way, a determination is made about whether there an entry in the in-memory data structure corresponding to the hash frag (which is identified by hash object ID, fragment ID>). If the hash frag is located, the process proceeds to Step 916; otherwise, the process proceeds to Step 914.

In Step 914, d is set to d−1. The process then proceeds to Step 908.

In Step 916, the hash frag is obtained. In one embodiment of the invention, the hash frag may be obtained from the solid state storage module using the corresponding physical address in the in-memory data structure (see e.g., FIG. 5). Alternatively, the control module may obtain the hash frag from memory (e.g., 210) if the hash frag is present in the memory.

In Step 918, a linear search is performed of the hash frag to obtain the hash frag entry that includes a hashed key that matches the hashed key generated in Step 902. Those skilled in the art will appreciate that if the hash frag does not include a matching hash frag entry, then the read request returns a notification to the client that no value corresponding to the key exists.

In Step 920, the value information or value is obtained from the hash frag entry. In one embodiment of the invention, if the hash frag entry includes the value, then the process proceeds to Step 936; otherwise, the process proceeds to step 922.

In step 922, the processor determines a location(s) of physical address(es) in in-memory data structure based on object ID and offset obtained from the hash frag entry. The <object ID, offset> may then be hashed to obtain a hashed value. The in-memory data structure may then be searched using the hashed value to identify a corresponding entry that, if present, includes the corresponding physical location(s) in the storage appliance. In step 924, the processor obtains (and loads) the physical address(es) from the location(s) determined in step 922. In one embodiment of the invention, the physical address corresponds to one or more locations of the value in the storage appliance. For example, the locations may include one or more of the following: a location in the memory of the processor, a location in memory in a storage module, and/or a location in a solid state memory module.

In an alternate embodiment of the invention, if the in-memory data structure includes a direct mapping of logical address(es) to physical address(es), then steps 922 and 924 may be combined to a single look-up in which the logical address is used to directly obtain the physical address(es).

In step 926, a determination is made about whether one of the locations is in the memory in the control module. If one of the locations is in the memory in the control module, the process proceeds to step 936; alternatively, the process proceeds to step 928. In one embodiment of the invention, in the event that there are multiple copies of the value in the storage appliance, the data is preferentially read from the memory in the control module. If the value is not present in the memory of the control module, the data is preferentially read from vaulted memory (if present in vaulted memory) and then from the solid state memory module (if a copy of the value is not present in the vaulted memory).

In step 928, the processor writes a Read Physical Data Command to the Submission Queue (SQ) of the Storage Module. In step 930, the storage module transfers the value from a physical location in the solid state memory module to the storage module memory (e.g., 324 in FIG. 3), initiates a DMA transfer of value from storage module memory to client memory, and then upon DMA completion, writes a read command completion to processor completion queue (CQ). In one embodiment of the invention, if the requested physical location is in the vaulted memory, then the storage module does not need to transfer value from the physical location in the solid state memory module to the storage module memory.

In one embodiment of the invention, the DMA engine is located in the storage module controller of the storage module in which the value is located. In one embodiment of the invention, the DMA engine is configured to send the copy of the value to the client switch. Upon receipt by the client switch, the client switch performs the necessary mapping (or translation) in order to identify the appropriate location in the client memory. The copy of the value is subsequently written to the identified location in the client memory.

In step 932, the storage module generates an interrupt for the processor. In step 934, the processor processes the data in its CQ. At this stage, the processor has been notified that the read request has been serviced. In step 938, once the processor has processed the data at the head of the completion queue, the client writes a new CQ head to the CQ head doorbell. This signifies to the storage module the next location in the CQ to use in future notifications to the processor. The process then proceeds to step 940.

In step 936, the processor programs a DMA engine (which may be located in the storage appliance or in the client switch) to read the value from the memory in the control module and write a copy of the value to a location in the client memory that is accessible via the non-transparent bridge. The DMA engine subsequently reads the value from the memory in the control module and writes a copy of the value to the client memory.

In step 940, the processor writes the SQ Identifier (which identifies the SQ of the processor) and a Read Command Identifier (which identifies the particular read command the client issued to the processor) to the completion queue (CQ) of the client. In step 942, the processor generates an interrupt for the client processor. In one embodiment of the invention, the processor uses the doorbell interrupts provided by the non-transparent bridge to issue an interrupt to the client processor. In step 944, the client processes the data in its CQ. At this stage, the client has been notified that the read request has been serviced. In step 946, once the client has processed the data at the head of the completion queue, the client writes a new CQ head to the CQ head doorbell. This signifies to the processor the next location in the CQ to use in future notifications to the client.

Those skilled in the art will appreciate that when searching for a hash frag, the storage appliance starts at the bottom of the hash tree table and searched one level at a time (starting at the leaves of the hash tree table) until a hash frag is located. Based on the manner in which hash frag entries are stored (see e.g., FIGS. 6C-6D), if the hash frag entry exists it will be present in the first hash frag encountered during the look-up. In one embodiment of the invention, if a hash frag is encountered that does not have the corresponding hash frag entry, then there is no value associated with key provided by the client.

Figure 10A:
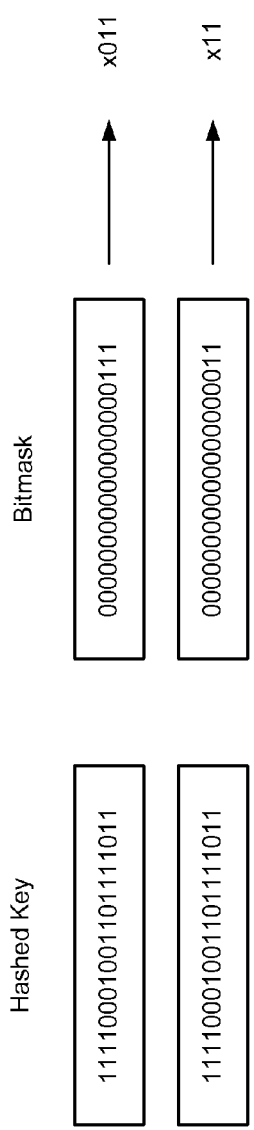
FIGS. 10A-10B show an example in accordance with one or more embodiments of the invention.
Figure 10B:
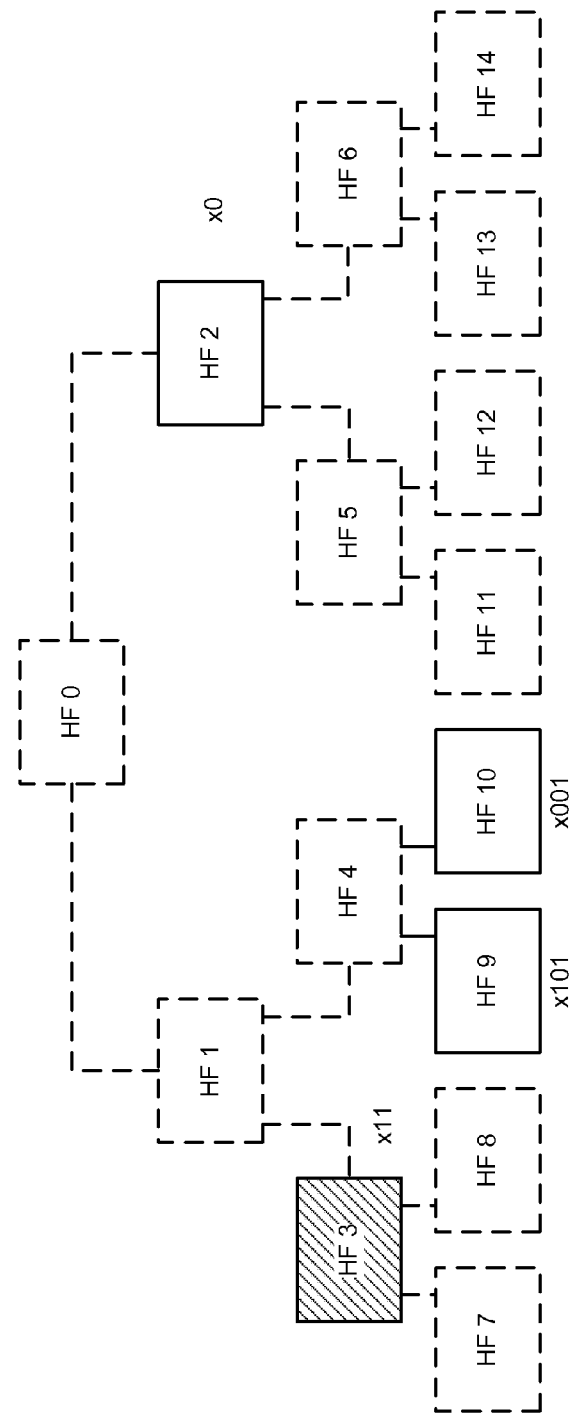

FIGS. 10A-10B show an example of reading data from a storage appliance in accordance with one or more embodiments of the invention. The example is not intended to limit the scope of the invention.

Consider the scenario in which the client issues a read command specifying a key. Upon receipt of the key, the storage appliance hashes the key to obtain the following hashed key: 11110001001101111011. The storage appliance subsequently determines the depth of the hash tree table to be three. Using the depth of the hash tree table, the storage appliance applies a bit mask ("00000000000000000111") to the hashed key to obtain the three LSB of the hashed key—"011". The storage appliance subsequently determines a fragment ID for a hash frag using "011" and the hash frag size. The fragment ID is used with the hash object ID to perform a look-up in the in-memory data structure. The aforementioned look-up should return HF 8; however, HF 8 does not exist. Accordingly, the aforementioned look-up will indicate that no such hash frag exists. At this stage, a second bit mask ("00000000000000000011") is applied to the hashed key to obtain the two LSB of the hashed key—"11". The storage appliance subsequently determines a fragment ID for a hash frag using "11" and the hash frag size. The fragment ID is used with the hash object ID perform a look-up in the in-memory data structure. The aforementioned look-up should return HF 3. Because HF 3 exists it is returned. At this point, a linear search of HF 3 is performed to locate (if present) the hash frag entry that includes a hashed key corresponding to the key specified by the client in the read request. If such a hash frag entry exists, then the value is obtained directly from the hash frag entry or using the value information in the hash frag entry.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions to perform a method, the method for writing data to persistent storage, comprising:
    receiving a first write request comprising a first key and a first value;
    hashing the first key to obtain a first hashed key;
    obtaining a hash table depth (d);
    obtaining d bits from the first hashed key, wherein the d bits from the first hashed key are d least significant bits in the first hashed key;
    making a first determination that a first hash frag associated with the d bits from the first hashed key exists;
    in response to the first determination:
        obtaining the first hash frag;
        making a second determination that there is available space to store a first hash frag entry in the first hash frag;
        storing the first hash frag entry in the first hash frag to obtain an updated first hash frag, wherein the first hash frag entry comprises the first hashed key and value information for the first value;
        storing the updated first hash frag in the persistent storage;
    receiving a second write request comprising a second key and a second value;
    hashing the second key to obtain a second hashed key;
    obtaining d bits from the second hashed key, wherein the d bits from the second hashed key are d least significant bits in the second hashed key;
    making a third determination that a second hash frag associated with the d bits from the second hashed key exists;
    in response to the third determination:
        obtaining the second hash frag, wherein the second hash frag comprises a plurality of existing hash frag entries;
        making a fourth determination that there is no available space to store a second hash frag entry in the second hash frag;
        creating, in response to the fourth determination, a third hash frag and a fourth hash frag;
        using d+1 least significant bits of each of the plurality of existing hash frags to place each of the existing hash frag entries in one selected from a group consisting of the third hash frag and the fourth hash frag;
        storing the second hash frag entry, comprising the second hashed key, in one selected from a group consisting of the third hash frag and the fourth hash frag using d+1 least significant bits in the second key hash;
        storing the third hash frag and the fourth hash frag in the persistent storage; and
        invalidating the second hash frag.

2. The non-transitory computer readable medium of claim 1, wherein a hash object comprises the updated first hash frag, the third hash frag, and the fourth hash frag.

3. The non-transitory computer readable medium of claim 2, wherein the first hash frag, the third hash frag, and the fourth hash frag are in non-contiguous locations in the persistent storage.

4. The non-transitory computer readable medium of claim 1, wherein making the first determination comprises:
    generating a fragment ID using the d bits from the first hashed object; and
    searching a data structure using a hash object ID and the fragment ID.

5. The non-transitory computer readable medium of claim 4, wherein the data structure is an in-memory data structure.

6. The non-transitory computer readable medium of claim 1, wherein the value information comprises an object ID for the first value and an offset for the first value, wherein the first value is stored in the persistent storage using the object ID and the offset.

7. The non-transitory computer readable medium of claim 1, wherein the value information comprises a logical address for the first value, wherein the first value is stored in the persistent storage using the logical address.

8. The non-transitory computer readable medium of claim 1, wherein the first hash frag is obtained from the persistent storage.

9. The non-transitory computer readable medium of claim 1, wherein the first hashed key is a 256-bit value.

10. The non-transitory computer readable medium of claim 1, wherein hashing the first key comprises applying SHA 2 to the first key.

11. The non-transitory computer readable medium of claim 1, wherein obtaining the d bits from the first hashed key comprises applying a bit-mask to the first hashed key, wherein the bit mask is generated using d.

12. The non-transitory computer readable medium of claim 1, wherein obtaining the hash table depth d comprises using a current size for a hash object.

13. The non-transitory computer readable medium of claim 1, wherein the persistent storage is NAND flash.

14. The non-transitory computer readable medium of claim 1, wherein the first hash key entry further comprises key information for the first hashed key.

15. A non-transitory computer readable medium comprising instructions to perform a method, the method for writing data to persistent storage, comprising:
    receiving a first write request comprising a first key and a first value;
    hashing the first key to obtain a first hashed key;
    obtaining a hash table depth (d);
    obtaining d bits from the first hashed key, wherein the d bits from the first hashed key are d least significant bits in the first hashed key;

making a first determination that a first hash frag associated with the d bits from the first hashed key exists;
in response to the first determination:
  obtaining the first hash frag;
  making a second determination that there is available space to store a first hash frag entry in the first hash frag;
  storing the first hash frag entry in the first hash frag to obtain an updated first hash frag, wherein the first hash frag entry comprises the first hashed key and the first value;
  storing the updated first hash frag in the persistent storage;
receiving a second write request comprising a second key and a second value;
hashing the second key to obtain a second hashed key;
obtaining d bits from the second hashed key, wherein the d bits from the second hashed key are d least significant bits in the second hashed key;
making a third determination that a second hash frag associated with the d bits from the second hashed key exists;
in response to the third determination:
  obtaining the second hash frag, wherein the second hash frag comprises a plurality of existing hash frag entries;
  making a fourth determination that there is no available space to store a second hash frag entry in the second hash frag;
  creating, in response to the fourth determination, a third hash frag and a fourth hash frag;
  using d+1 least significant bits of each of the plurality of existing hash frags to place each of the existing hash frag entries in one selected from a group consisting of the third hash frag and the fourth hash frag;
  storing the second hash frag entry, comprising the second hashed key, in one selected from a group consisting of the third hash frag and the fourth hash frag using d+1 least significant bits in the second key hash;
  storing the third hash frag and the fourth hash frag in the persistent storage; and
  invalidating the second hash frag.

* * * * *